United States Patent
Nakamura et al.

(10) Patent No.: US 12,040,508 B2
(45) Date of Patent: Jul. 16, 2024

(54) POWER STORAGE MODULE, AND MANUFACTURING METHOD THEREFOR

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Tomohiro Nakamura, Kariya (JP); Takayuki Hirose, Kariya (JP); Nobuyasu Haga, Seto (JP); Motoyoshi Okumura, Nagoya (JP); Yohei Hamaguchi, Kariya (JP); Kyohei Oda, Kariya (JP); Yasuaki Takenaka, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 463 days.

(21) Appl. No.: 17/274,830

(22) PCT Filed: Sep. 25, 2019

(86) PCT No.: PCT/JP2019/037593
§ 371 (c)(1),
(2) Date: Mar. 10, 2021

(87) PCT Pub. No.: WO2020/067153
PCT Pub. Date: Apr. 2, 2020

(65) Prior Publication Data
US 2022/0059912 A1 Feb. 24, 2022

(30) Foreign Application Priority Data

Sep. 25, 2018 (JP) ................................. 2018-179298
Feb. 26, 2019 (JP) ................................. 2019-033193

(51) Int. Cl.
*H01M 50/00* (2021.01)
*H01M 10/04* (2006.01)
(Continued)

(52) U.S. Cl.
CPC ..... *H01M 50/547* (2021.01); *H01M 10/0418* (2013.01); *H01M 50/10* (2021.01); *H01M 50/186* (2021.01); *H01M 50/55* (2021.01)

(58) Field of Classification Search
CPC .......... H01M 50/547; H01M 10/0418; H01M 50/10; H01M 50/186; H01M 50/55; (Continued)

(56) References Cited

U.S. PATENT DOCUMENTS

2004/0091771 A1 5/2004 Hosaka et al.
2009/0023061 A1 1/2009 Ogg et al.
(Continued)

FOREIGN PATENT DOCUMENTS

CN 101743653 A 6/2010
JP 2004-158343 A 6/2004
(Continued)

OTHER PUBLICATIONS

JP-2018049793-A, english translation as taught by Tamaru (Year: 2018).*
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A power storage module comprises: an electrode stacked body including a stacked body in which a plurality of bipolar electrodes are stacked, a pair of terminal electrodes located on an outer side of the stacked body in a stacking direction of the bipolar electrodes, and a plurality of metal plates which constitute the stacked body and the pair of terminal
(Continued)

electrodes; and a sealing body provided to surround a side surface of the electrode stacked body. The sealing body includes a plurality of first sealing portions coupled to edge portions of the plurality of metal plates, and a second sealing portion that couples the first sealing portions to each other. A thickness adjustment member that adjusts the thickness of the electrode stacked body in the stacking direction is disposed in the electrode stacked body at a position of overlapping the first sealing portions when viewed from the stacking direction.

21 Claims, 12 Drawing Sheets

(51) Int. Cl.
*H01M 50/10* (2021.01)
*H01M 50/186* (2021.01)
*H01M 50/547* (2021.01)
*H01M 50/55* (2021.01)

(58) Field of Classification Search
CPC ........... H01M 10/044; H01M 10/0468; H01M 10/04; H01G 11/28; H01G 11/82; H01G 11/12; H01G 11/78; H01G 11/80; Y02T 10/70; Y02E 60/10; Y02P 70/50
See application file for complete search history.

(56) References Cited

U.S. PATENT DOCUMENTS

| | | |
|---|---|---|
| 2013/0095366 A1 | 4/2013 | Ogg et al. |
| 2013/0101882 A1 | 4/2013 | Ogg et al. |
| 2013/0101890 A1 | 4/2013 | Ogg et al. |

FOREIGN PATENT DOCUMENTS

| | | | | |
|---|---|---|---|---|
| JP | 2010-92662 A | | 4/2010 | |
| JP | 2010-518580 A | | 5/2010 | |
| JP | 2010-272266 A | | 12/2010 | |
| JP | 2011-204386 A | | 10/2011 | |
| JP | 2018-49793 A | | 3/2018 | |
| JP | 2018049793 A | * | 3/2018 | |
| JP | 2018-73509 A | | 5/2018 | |
| JP | 2018085293 A | * | 5/2018 | |
| JP | 2020030985 A | * | 2/2020 | |
| KR | 20100075533 A | * | 7/2010 | .............. H01M 4/13 |
| KR | 20110055443 A | * | 5/2011 | ........ H01M 10/0585 |

OTHER PUBLICATIONS

JP-2020030985-A, english translation as taught by Hirose (Year: 2020).*
JP-2018085293-A, english translation as taught by Kotake (Year: 2018).*
Takayama et al., Manufacturing Method of Bipolar Cell and Bipolar Cell, Jul. 2010, See the Abstract. (Year: 2010).*
Chung et al., Bipolar Electrode/Separator Assembly, Bipolar Battery Comprising the Same and Method of Manufacturing the Same, May 2011, See the Abstract. (Year: 2011).*
International Search Report of PCT/JP2019/037593 dated Dec. 24, 2019 [PCT/ISA/210].
International Preliminary Report on Patentability with the translation of Written Opinion dated Apr. 8, 2021 from the International Bureau in International application No. PCT/JP2019/037593.
Indian Office Action dated Dec. 6, 2023 in Indian Application No. 202117012258.

* cited by examiner

POWER STORAGE MODULE, AND MANUFACTURING METHOD THEREFOR

CROSS REFERENCE TO RELATED APPLICATIONS

This application is a National Stage of International Application No. PCT/JP2019/037593 filed on Sep. 25, 2019, claiming priority based on Japanese Patent Application No. 2018-179298 filed on Sep. 25, 2018 and Japanese Patent Application No. 2019-033193 filed on Feb. 26, 2019.

TECHNICAL FIELD

The present disclosure relates to a power storage module and a manufacturing method therefor.

BACKGROUND ART

As a power storage module in the related art, a bipolar battery including bipolar electrodes in which a positive electrode is formed on one surface of a metal plate, and a negative electrode is formed on the other surface is known (for example, refer to Patent Literature 1). The bipolar battery includes an electrode stacked body obtained by stacking a plurality of bipolar electrodes through a separator. A sealing body that seals a space between bipolar electrodes adjacent in a stacking direction is provided on a side surface of the electrode stacked body, and an electrolytic solution is stored in an inner space formed between the bipolar electrodes.

CITATION LIST

Patent Literature

Patent Literature 1: Japanese Unexamined Patent Publication No. 2011-204386

SUMMARY OF INVENTION

Technical Problem

In the power storage module as described above, for example, a first sealing portion is formed in each edge portion of the metal plate of the bipolar electrode, and a plurality of the first sealing portions are coupled by a second sealing portion formed through injection molding or the like, thereby forming a sealing body. When forming the second sealing portion, it is important to manage the thickness of the electrode stacked body including the first sealing portions in a stacking direction. When the thickness of the electrode stacked body in the stacking direction deviates from the standard, it leads to a molding failure of the second sealing portion, and there is a concern that a sealing failure of the power storage module may be caused.

The present disclosure has been made to solve the problem, and an object thereof is to provide a power storage module and a manufacturing method therefor which are capable of suppressing occurrence of a sealing failure.

Solution to Problem

According to an aspect of the present invention, there is provided a power storage module including: an electrode stacked body that includes a stacked body in which a plurality of bipolar electrodes are stacked, a pair of terminal electrodes located on an outer side of the stacked body in a stacking direction of the bipolar electrodes, and a plurality of metal plates which constitute the stacked body and the pair of terminal electrodes; and a sealing body that is provided to surround a side surface of the electrode stacked body. The sealing body includes a plurality of first sealing portions coupled to edge portions of the plurality of metal plates, and a second sealing portion that couples the first sealing portions to each other. A thickness adjustment member that adjusts the thickness of the electrode stacked body in the stacking direction is disposed in the electrode stacked body at a position of overlapping the first sealing portions when viewed from the stacking direction.

In the power storage module, the thickness adjustment member that adjusts the thickness of the electrode stacked body in the stacking direction is disposed. Since the thickness of the electrode stacked body including the first sealing portions in the stacking direction is adjusted by the thickness adjustment member, the thickness of the electrode stacked body including the first sealing portion in the stacking direction can be easily set within the standard when forming the second sealing portion. In addition, since the thickness adjustment member is disposed at a position of overlapping the first sealing portions when viewed from the stacking direction, even after disposing the thickness adjustment member, a shape of the entirety of the electrode stacked body including the first sealing portion can be maintained. According to this, occurrence of a molding failure of the second sealing portion can be suppressed, and occurrence of a sealing failure of the electrode stacked body can be suppressed. In addition, since the thickness adjustment member is disposed at the position where the thickness adjustment member overlaps the first sealing portions when viewed from the stacking direction, the thickness adjustment member and the first sealing portions can be set to the same shape when viewed from the stacking direction. As a result, when forming the thickness adjustment member and the first sealing portion by a punching, a punching die for the thickness adjustment member and the first sealing portion can be made common to each other.

The thickness adjustment member may be formed from the same material as in the first sealing portions, and may be configured separately from the first sealing portions. According to this, the material of the thickness adjustment member and the material of the first sealing portions can be made common to each other, and simplification of a configuration of the power storage module can be realized. The thickness adjustment member may be configured by the first sealing portions.

One of the pair of terminal electrodes may be a negative terminal electrode, the other of the pair of terminal electrodes may be a positive terminal electrode, and the thickness adjustment member may be disposed on at least one side between the stacked body and the negative terminal electrode and between the stacked body and the positive terminal electrode in the stacking direction.

The thickness adjustment member may be disposed between the stacked body and the negative terminal electrode, and at an edge portion of an inner surface of the metal plate of the negative terminal electrode in the stacking direction. The thickness adjustment member may be disposed between the stacked body and the positive terminal electrode, and at the first sealing portion coupled to an edge portion of an inner surface of the metal plate of the positive terminal electrode in the stacking direction. In this case, since the thickness adjustment member is sandwiched between the first sealing portions adjacent to each other, occurrence of positional deviation between the first sealing portions and the thickness adjustment member can be suppressed.

The thickness adjustment member may be disposed both between the stacked body and the negative terminal electrode and between the stacked body and the positive terminal electrode in the stacking direction. In this case, since the thickness adjustment member can be disposed when stacking the negative terminal electrode and the positive terminal electrode on the stacked body of the bipolar electrodes, disposition of the thickness adjustment member to the electrode stacked body can become easy. In addition, the thickness of the electrode stacked body in the stacking direction can be finely adjusted by a combination of the thickness adjustment member disposed between the stacked body and the negative terminal electrode and the thickness adjustment member disposed between the stacked body and the positive terminal electrode.

The thickness of the thickness adjustment member disposed between the stacked body and the negative terminal electrode, and the thickness of the thickness adjustment member disposed between the stacked body and the positive terminal electrode may be the same as each other. In this case, fine adjustment of the thickness of the electrode stacked body in the stacking direction and simplification of a configuration of the power storage module can be made compatible with each other. In addition, in this case, an inner space close to the negative terminal electrode of the electrode stacked body and an inner space close to the positive terminal electrode of the electrode stacked body can be made even. As a result, a change of the inner space between respective electrodes in the electrode stacked body can be suppressed to the minimum, and a deviation in state of charge (SOC) between the respective electrodes can be reduced.

The thickness adjustment member may be disposed at any site between the stacked body and the negative terminal electrode and between the stacked body and the positive terminal electrode in the stacking direction. In this case, the thickness of the electrode stacked body in the stacking direction can be adjusted while avoiding an increase in the number of parts.

The electrode stacked body may further include an outermost metal plate that is located on an outer side of one of the pair of terminal electrodes in the stacking direction, and the stacked body may further include separators stacked alternately with the bipolar electrodes along the stacking direction. The first sealing portions may be coupled to edge portions of the metal plates and the outermost metal plate, and the second sealing portion may cover a side surface of the plurality of first sealing portions. The thickness adjustment member may be located between the one of the pair of terminal electrodes and the outermost metal plate, and may adjust the thickness of the electrode stacked body in the stacking direction. In this case, the thickness adjustment member is located between one of the pair of terminal electrodes and the outermost metal plate, and at a site overlapping the first sealing portions in the stacking direction. Accordingly, at the time of manufacturing the power storage module, the thickness adjustment member can be disposed at the site before forming the second sealing portion. According to this, a total thickness of the electrode stacked body and the thickness adjustment member in the stacking direction can be adjusted to a standard thickness determined in advance before forming the second sealing portion. Therefore, when forming the second sealing portion, occurrence of a formation failure of the second sealing portion can be suppressed. As a result, it is possible to provide a power storage module capable of suppressing occurrence of the sealing failure.

The one of the pair of terminal electrodes may be a negative terminal electrode, the thickness adjustment member may be in contact with the outermost metal plate and the first sealing portion that is coupled to the metal plate of the negative terminal electrode, and the thickness adjustment member may be spaced apart from the negative terminal electrode. In this case, since the negative terminal electrode is protected from an external environment by the outermost metal plate, deterioration of the negative terminal electrode can be suppressed. In addition, since the thickness adjustment member is spaced apart from the negative terminal electrode, a function exhibited by the thickness adjustment member is less likely to be affected by the negative terminal electrode.

The one of the pair of terminal electrodes may be a negative terminal electrode, and the thickness adjustment member may be in contact with the negative terminal electrode and the outermost metal plate.

The one of the pair of terminal electrodes may be a positive terminal electrode, and the thickness adjustment member may be in contact with the positive terminal electrode and the outermost metal plate. In this case, since the positive terminal electrode is protected from the external environment by the outermost metal plate, deterioration of the positive terminal electrode can be suppressed. In addition, the thickness adjustment member is strongly fixed by the positive terminal electrode and the outermost metal plate.

The electrode stacked body may further include an additional outermost metal plate that is located on an outer side of the other of the pair of terminal electrodes in the stacking direction, and an additional thickness adjustment member that adjusts the thickness of the electrode stacked body in the stacking direction may be located between the other of the pair of terminal electrodes and the additional outermost metal plate and at a site overlapping the first sealing portions in the stacking direction. In this case, a total thickness of the electrode stacked body and each thickness adjustment member along the stacking direction can be adjusted to a standard thickness with accuracy before forming the second sealing portion.

An alkali electrolytic solution may be stored in an inner space made by the electrode stacked body and the sealing body, and a surplus space may be formed by the negative terminal electrode, the first sealing portion that is coupled to the metal plate of the negative terminal electrode, the outermost metal plate, and the thickness adjustment member. There is a concern that the alkali electrolytic solution stored in the inner space may flow to the outside of the power storage module through a gap between the first sealing portion and the metal plate of the negative terminal electrode due to a so-called alkali creep phenomenon. In contrast, since the electrode stacked body includes the outermost metal plate that is located on an outer side of the terminal electrode in the stacking direction, the surplus space is formed. According to this, the flowed alkali electrolytic solution can be suppressed from being leaked to the outside of the power storage module. In addition, entrance of moisture contained in external air from the gap between the negative terminal electrode and the first sealing portion can also be suppressed. According to this, acceleration of the alkali creep phenomenon caused by the moisture can be suppressed. As a result, flowing of the alkali electrolytic solution to the outside of the power storage module can be suppressed in a satisfactory manner.

The first sealing portion may be coupled to an edge portion of the additional outermost metal plate, the second sealing portion may couple the first sealing portions which are coupled to the metal plates of the bipolar electrodes, the first sealing portion that is coupled to the outermost metal plate, and the first sealing portion that is coupled to the additional outermost metal plate. In this case, the electrode stacked body including the bipolar electrodes, the outermost metal plate, and the additional outermost metal plate can be strongly integrated.

A distance from the one of the pair of terminal electrodes to the edge portion of the outermost metal plate along the stacking direction may be different from a distance from the other of the pair of terminal electrode to an edge portion of the additional outermost metal plate along the stacking direction.

The outermost metal plate may include a first contact portion that is in contact with the one of the pair of terminal electrodes, the additional outermost metal plate may include a second contact portion that is in contact with the other of the pair of terminal electrodes, and an area of the first contact portion may be different from an area of the second contact portion when viewed from the stacking direction.

The other of the pair of terminal electrodes may be a negative terminal electrode, the electrode stacked body may further include an additional outermost metal plate that is located on an outer side of the negative terminal electrode in the stacking direction, an alkali electrolytic solution may be stored in an inner space made by the electrode stacked body and the sealing body, and a first surplus space may be formed by the negative terminal electrode, the first sealing portion coupled to the metal plate of the negative terminal electrode, and the additional outermost metal plate. Even in this case, as described above, flowing of the alkali electrolytic solution to the outside of the power storage module due to the alkali creep phenomenon can be suppressed in a satisfactory manner. In addition, since the first surplus space is formed without using the thickness adjustment member, a shape and a volume of the first surplus space can be strictly defined, and air-tightness of the first surplus space can be secured.

A second surplus space may be formed by the negative terminal electrode, the first sealing portion that is coupled to the metal plate of the negative terminal electrode, the first sealing portion that is coupled to the metal plate of the bipolar electrode adjacent to the negative terminal electrode in the stacking direction, and the second sealing portion. In this case, flowing of the alkali electrolytic solution to the outside of the power storage module due to the alkali creep phenomenon can be suppressed in a more satisfactory manner.

The thickness adjustment member may include a plurality of layered members stacked along the stacking direction. In this case, the thickness of the thickness adjustment member can be easily adjusted by changing the number of the layered members included in the thickness adjustment member. Accordingly, a thickness adjustment member corresponding to each power storage module can be easily prepared.

Each of the thickness adjustment member and the plurality of first sealing portions may contain an alkali-resistant thermoplastic resin. In this case, when forming the second sealing portion, the first sealing portion and the second sealing portion can be coupled in a satisfactory manner.

According to another aspect of the present invention, there is provided a method for manufacturing a power storage module. The method includes: forming a stacked body by alternately stacking bipolar electrodes to which first sealing portions are respectively coupled and separators along a stacking direction; measuring the thickness of the stacked body along the stacking direction; calculating a difference between the thickness of the stacked body and a standard thickness of the stacked body along the stacking direction; stacking a thickness adjustment member having a thickness corresponding to the difference on the first sealing portion in the stacking direction; stacking an outermost metal plate to which an additional first sealing portion is coupled on the stacking body through the thickness adjustment member; and forming a second sealing portion that couples the first sealing portions, the thickness adjustment member, and the additional first sealing portion.

In the method for manufacturing the power storage module, the thickness adjustment member having a thickness corresponding to a difference between a dimension of the stacked body along the stacking direction and a standard thickness of the stacked body is superimposed on the first sealing portion before forming the second sealing portion. According to this, before the forming the second sealing portion, it is possible to adjust a total thickness of the first sealing portions included in the stacked body, the thickness adjustment member, and the outermost metal plate along the stacking direction to the standard thickness determined in advance. According to this, when forming the second sealing portion, occurrence of a formation failure of the second sealing portion can be suppressed. Accordingly, according the manufacturing method, occurrence of the sealing failure of the power storage module can be suppressed.

The thickness of the thickness adjustment member may correspond to a difference between a total value obtained by adding the thickness of the outermost metal plate along the stacking direction to the thickness of the stacked body and a total standard value obtained by adding a standard thickness of the outermost metal plate along the stacking direction to the standard thickness of the stacked body along the stacking direction. In this case, the total thickness can be adjusted within a range of the total standard value with accuracy.

The forming the stacked body and the measuring the thickness of the stacked body may be simultaneously performed. In this case, it is possible to shorten time necessary for manufacturing the power storage module.

Advantageous Effects of Invention

According to the power storage module and the manufacturing method thereof, occurrence of a sealing failure can be suppressed.

DESCRIPTION OF EMBODIMENTS

First Embodiment

Figure 1:
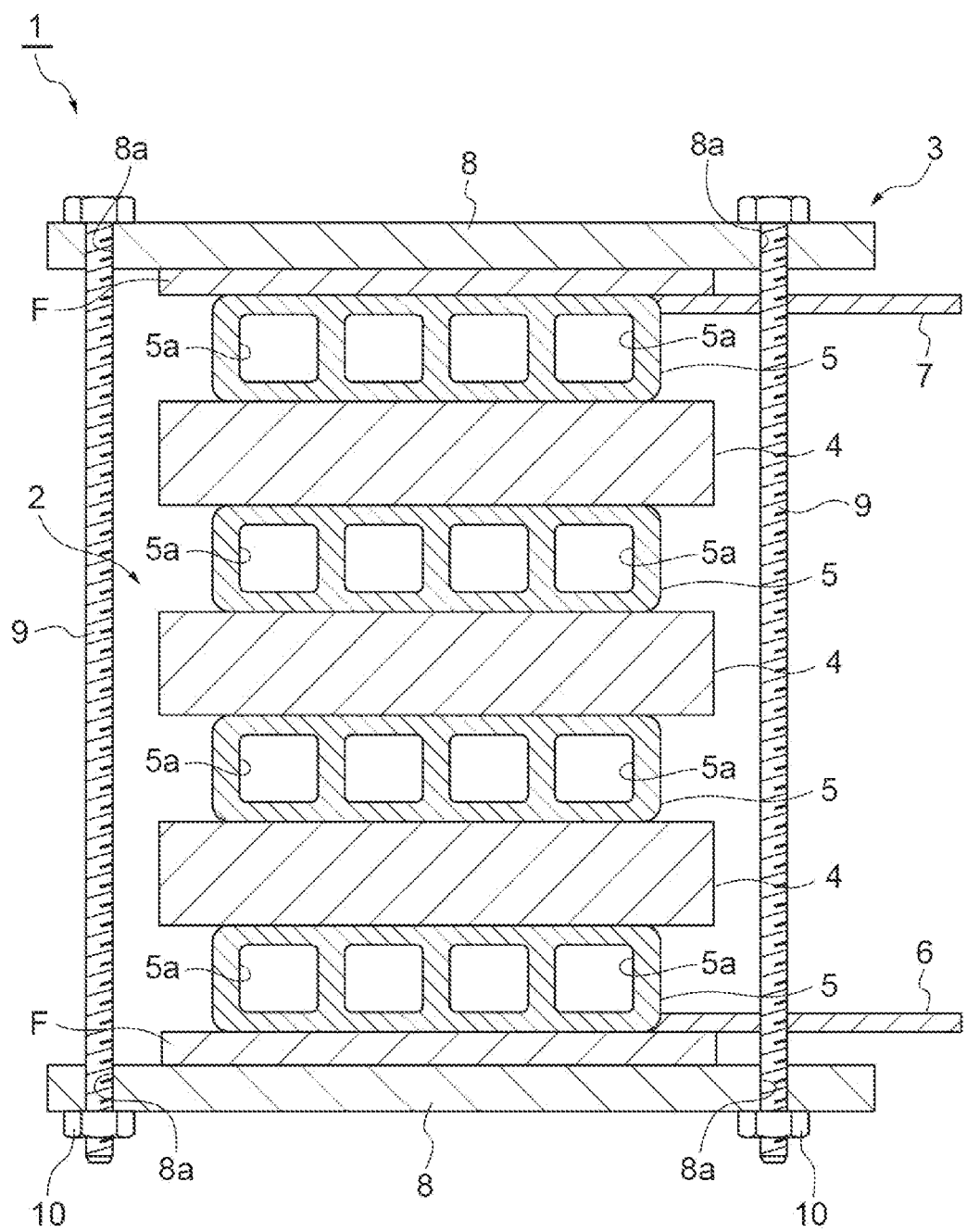
FIG. 1 is a schematic cross-sectional view illustrating a power storage device including a power storage module according to a first embodiment.

FIG. 1 is a schematic cross-sectional view illustrating a power storage device 1 including a power storage module 4 according to a first embodiment. The power storage device 1 illustrated in FIG. 1 is used, for example, as batteries of various vehicles such as a forklift, a hybrid vehicle, and an electric vehicle. The power storage device 1 includes a module stacked body 2 including a plurality of power storage modules 4 which are stacked, and a constraining member 3 that applies a constraining load to the module stacked body 2 in a stacking direction of the module stacked body 2.

The module stacked body 2 includes a plurality of (in this embodiment, three) the power storage modules 4, and a plurality of (in this embodiment, four) of conductive structure bodies 5. Each of the power storage modules 4 is a bipolar battery, and has an approximately rectangular shape when viewed from a stacking direction. For example, the power storage module 4 is a secondary battery such as a nickel-hydrogen secondary battery and a lithium ion secondary battery, or an electric double-layer capacitor. In the following description, the nickel-hydrogen secondary battery will be exemplified as the power storage module 4.

The power storage modules 4 adjacent to each other in the stacking direction are electrically connected through the conductive structure body 5. The conductive structure body 5 is disposed between the power storage modules 4 adjacent to each other in the stacking direction, and on an outer side of the power storage modules 4 located at stacking ends, respectively. A positive electrode terminal 6 is connected to one of the conductive structure bodies 5 disposed on an outer side of the power storage modules 4 located at the stacking ends. A negative electrode terminal 7 is connected to the other conductive structure body 5 disposed on an outer side of the other power storage module 4 located at the stacking ends. For example, the positive electrode terminal 6 and the negative electrode terminal 7 extend from edge portions of the conductive structure bodies 5 in a direction that intersects the stacking direction. Charging and discharging of the power storage device 1 are carried out by the positive electrode terminal 6 and the negative electrode terminal 7. In the power storage device 1, the power storage module 4 may be disposed at one end and the other end in the stacking direction D, respectively. That is, the outermost layer (that is, a stack outermost layer) of a stacked body of the power storage module 4 and the conductive structure body 5 in the power storage device 1 may be the power storage module 4. In this case, the negative electrode terminal 7 or the positive electrode terminal 6 is connected to the power storage module 4 that constitutes the stack outermost layer.

A plurality of flow passages 5a through which a coolant such as air is circulated are provided inside the conductive structure body 5. For example, the flow passages 5a extend along a direction that intersects (in an example, that is perpendicular to) the stacking direction and the extension direction of the positive electrode terminal 6 and the negative electrode terminal 7. The conductive structure body 5 has a function as a connection member that electrically connects the power storage modules 4 adjacent to each other and a function as a heat dissipation plate for dissipating heat from the power storage module 4 by circulating a cooling fluid through the flow passages 5a. In the example illustrated in FIG. 1, an area of the conductive structure body 5 when viewed from the stacking direction is smaller than an area of the power storage module 4. However, the area of the conductive structure body 5 may be equal to the area of the power storage module 4 or may be greater than the area of the power storage module 4 from the viewpoints of improving heat dissipation.

The constraining member 3 includes a pair of end plates 8 between which the module stacked body 2 is interposed in the stacking direction, and a fastening bolt 9 and a nut 10 which fasten the end plates 8 to each other. Each of the end plates 8 is an approximately rectangular metal plate having an area that is slightly larger than the areas of the power storage module 4 and the conductive structure body 5 when viewed from the stacking direction. A film F having an electrical insulation property is provided on a surface of the end plates 8 on the module stacked body 2 side. Each of the end plates 8 and the conductive structure body 5 are insulated from each other by the film F.

An insertion hole 8a is provided in an edge portion of the end plate 8 at a position on a further outer side in comparison to the module stacked body 2. The fastening bolt 9 passes through from the insertion hole 8a of one of the end plates 8 toward the insertion hole 8a of the other end plate 8. The nut 10 is screwed to a tip end portion of the fastening bolt 9 protruding from the insertion hole 8a of the other end plate 8. According to this, the power storage module 4 and the conductive structure body 5 are sandwiched by the end plates 8 to form a unit as the module stacked body 2. In addition, a constraining force is applied to the module stacked body 2 as the unit in the stacking direction.

Figure 2:
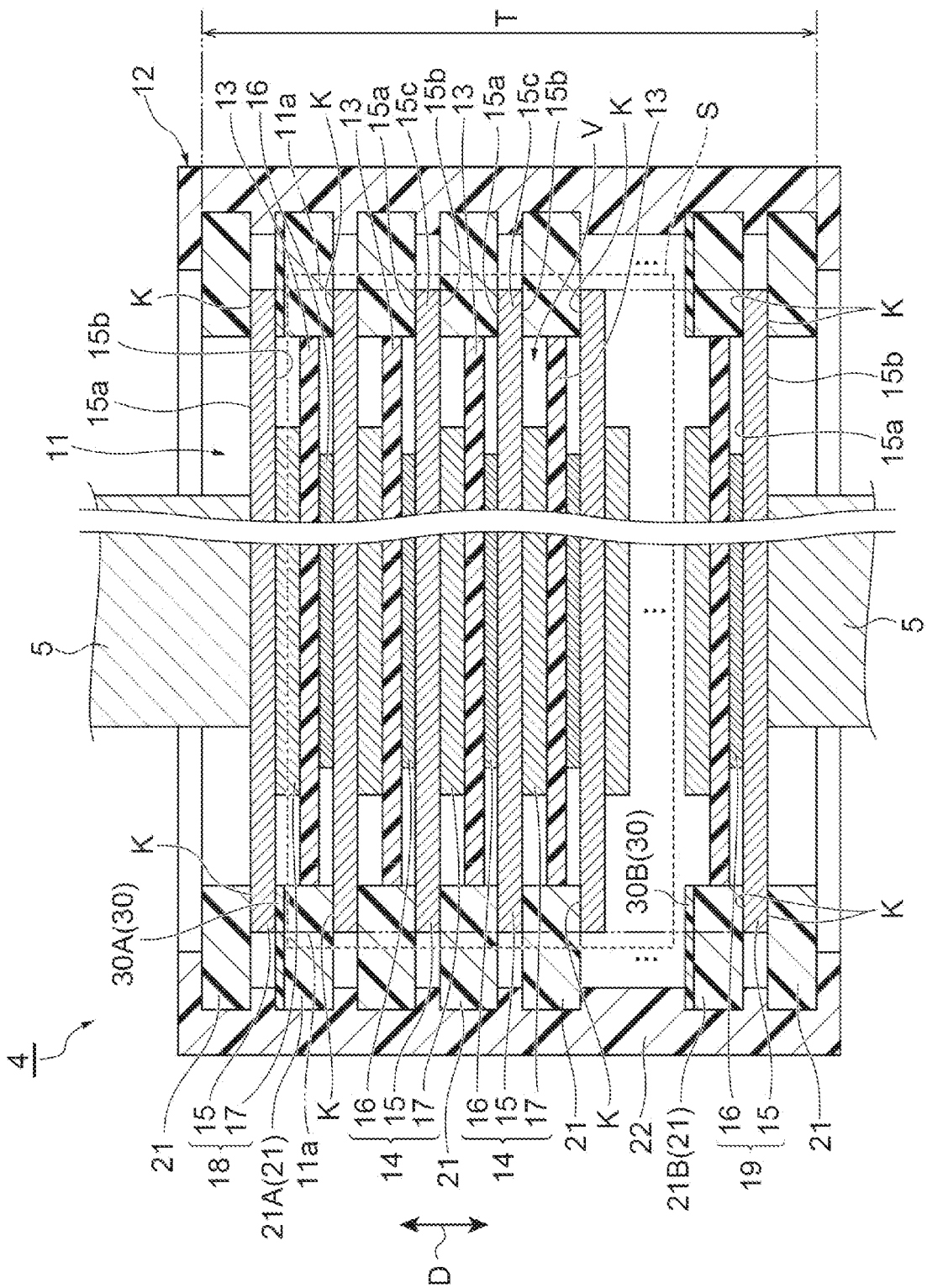
FIG. 2 is a schematic cross-sectional view illustrating an internal configuration of the power storage module illustrated in FIG. 1.

Next, a configuration of the power storage module 4 will be described in detail. FIG. 2 is a schematic cross-sectional view illustrating an internal configuration of the power storage module 4. As illustrated in FIG. 2, the power storage module 4 includes an electrode stacked body 11 and a sealing body 12 that is formed from a resin and seals the electrode stacked body 11. The electrode stacked body 11 includes a plurality of electrodes stacked along the stacking direction D of the power storage module 4 through a separator 13. The electrode stacked body 11 includes a stacked body S of a plurality of bipolar electrodes 14, a negative terminal electrode 18 that is disposed on one outer side of the stacked body S in the stacking direction D, and a positive terminal electrode 19 that is disposed on the other outer side of the stacked body S in the stacking direction D.

Each of the bipolar electrodes 14 includes a metal plate 15 including one surface 15a and the other surface 15b on a side opposite to the one surface 15a, a positive electrode 16 provided on the one surface 15a, and a negative electrode 17 provided on the other surface 15b. The positive electrode 16 is a positive electrode active material layer formed by coating a positive electrode active material on the metal plate 15. The negative electrode 17 is a negative electrode active material layer formed by coating a negative electrode active material on the metal plate 15. In the electrode stacked body 11, the positive electrode 16 of one of the bipolar electrodes 14 faces the negative electrode 17 of another bipolar electrode 14 that is adjacent on one side of the stacking direction D with the separator 13 interposed therebetween. In the electrode stacked body 11, the negative electrode 17 of one of the bipolar electrodes 14 faces the positive electrode 16 of another bipolar electrode 14 that is adjacent on the other side of the stacking direction D with the separator 13 interposed therebetween.

The negative terminal electrode 18 includes the metal plate 15 and the negative electrode 17 that is provided on the other surface 15b of the metal plate 15. The negative terminal electrode 18 is disposed at one end in the stacking direction D so that the other surface 15b faces an inner side (that is, a central side) in the stacking direction D in the electrode stacked body 11. The one surface 15a of the metal plate 15 of the negative terminal electrode 18 constitutes one outer surface of the electrode stacked body 11 in the stacking direction D, and is electrically connected to one conductive structure body 5 (refer to FIG. 1) adjacent to the power storage module 4. The negative electrode 17 that is provided on the other surface 15b of the metal plate 15 of the negative terminal electrode 18 faces the positive electrode 16 of the bipolar electrode 14 at the one end in the stacking direction D through the separator 13.

The positive terminal electrode 19 includes the metal plate 15 and the positive electrode 16 that is provided on the one surface 15a of the metal plate 15. The positive terminal electrode 19 is disposed at the other end in the stacking direction D so that the one surface 15a faces an inner side in the stacking direction D in the electrode stacked body 11. The positive electrode 16 that is provided on the one surface 15a of the positive terminal electrode 19 faces the negative electrode 17 of the bipolar electrode 14 at the other end in the stacking direction D through the separator 13. The other surface 15b of the metal plate 15 of the positive terminal electrode 19 constitutes the other outer surface of the electrode stacked body 11 in the stacking direction D, and is electrically connected to the other conductive structure body 5 adjacent to the power storage module 4.

For example, the metal plate 15 is formed from a metal such as nickel and a nickel-plated steel plate. As an example, the metal plate 15 is approximately rectangular metal foil formed from nickel. A peripheral edge portion 15c of the metal plate 15 has an approximately rectangular shape, and is set as an uncoated region that is not coated with the positive electrode active material and the negative electrode active material. Examples of the positive electrode active material that constitutes the positive electrode 16 include nickel hydroxide. Examples of the negative electrode active material that constitutes the negative electrode 17 include a hydrogen occluding alloy. In this embodiment, a formation region of the negative electrode 17 on the other surface 15b of the metal plate 15 is slightly greater than a formation region of the positive electrode 16 on the one surface 15a of the metal plate 15.

For example, the separator 13 is formed in a sheet shape. For example, the separator 13 is a porous film formed from a polyolefin-based resin such as polyethylene (PE) and polypropylene (PP). The separator 13 may be a woven fabric, a non-woven fabric, or the like formed from polypropylene, methylcellulose, or the like. The separator 13 may be reinforced with a vinylidene fluoride resin compound. The separator 13 may have a bag shape without limitation to the sheet shape.

For example, the sealing body 12 is formed from an insulating resin in a rectangular tube shape as a whole. The sealing body 12 is provided on a side surface 11a of the electrode stacked body 11 to surround the peripheral edge portion 15c of the metal plate 15. The sealing body 12 holds the peripheral edge portion 15c at the side surface 11a. The sealing body 12 includes a plurality of first sealing portions 21 coupled to a plurality of the peripheral edge portions 15c of a plurality of the metal plates 15, and a second sealing portion 22 that surrounds the first sealing portions 21 from an outer side along the side surface 11a and couples the first sealing portions 21. For example, each of the first sealing portions 21 and the second sealing portion 22 is an alkali-resistant insulating resin. Examples of a constituent material of each of the first sealing portions 21 and the second sealing portion 22 include polypropylene (PP), polyphenylene sulfide (PPS), modified polyphenylene ether (modified PPE), and the like.

The first sealing portions 21 are continuously provided over the entire periphery of the peripheral edge portions 15c in the metal plates 15, and have a rectangular shape when viewed from the stacking direction D. For example, Each of the first sealing portions 21 is a film having a predetermined thickness in the stacking direction D. An inner edge portion of the first sealing portion 21 is provided in each of the peripheral edge portion 15c at the one surface 15a of the metal plate 15 of the bipolar electrode 14, the peripheral edge portion 15c at the one surface 15a of the metal plate 15 of the negative terminal electrode 18, and the peripheral edge portion 15c at the one surface 15a and the other surface 15b of the metal plate 15 of the positive terminal electrode 19 when viewed from the stacking direction D.

For example, the inner edge portion of the first sealing portion 21 is welded to the peripheral edge portion 15c of the metal plate 15 by ultrasonic waves or heat and is air-tightly coupled thereto. An outer edge portion of the first sealing portion 21 extends to an outer side in comparison to an outer edge of the metal plate 15 when viewed from the stacking direction D, and is held by the second sealing portion 22. The first sealing portions 21 adjacent to each other along the stacking direction D may be spaced apart from each other or may be in contact with each other.

A region where the peripheral edge portion 15c of the one surface 15a in the metal plate 15 and the first sealing portion 21 overlap each other, and a region where the peripheral edge portion 15c of the other surface 15b in the metal plate 15 of the positive terminal electrode 19 and the first sealing portion 21 overlap each other are set as a coupling region K of the metal plate 15 and the first sealing portion 21. A surface of the metal plate 15 in the coupling region K is roughened. In this embodiment, the entirety of the one surface 15a of the metal plates 15 and the entirety of the other surface 15b in the metal plate 15 of the positive terminal electrode 19 are roughened. However, only the coupling region K of the one surface 15a in each of the metal plates 15 may be roughened, and only the coupling region K of the other surface 15b in the metal plate 15 of the positive terminal electrode 19 may be roughened.

For example, roughening may be realized by forming a plurality of protrusions through electrolytic plating. For example, when roughening the one surface 15a of the metal plate 15, at a joining interface between the one surface 15a of the metal plate 15 and the first sealing portion 21, a plurality of protrusions are formed on the one surface 15a, and thus a resin in a molten state enters between the plurality of protrusions. According to this, an anchor effect is exhibited, and thus coupling strength between the metal plate 15 and the first sealing portion 21 can be improved. For example, the protrusion formed at the time of roughening has a shape that is tapered from a base end to a tip end. According to this, a cross-sectional shape between adjacent protrusions becomes an undercut shape, and the anchor effect can be enhanced.

The second sealing portion 22 is provided on an outer side of the electrode stacked body 11 and the first sealing portion 21, and constitutes an outer wall (that is, a housing) of the power storage module 4. For example, the second sealing portion 22 is formed by injection molding of a resin, and extends over the entire length of the electrode stacked body 11 along the stacking direction D. The second sealing portion 22 has a rectangular tubular shape (that is, an annular shape) that extends with the stacking direction D set as an axial direction. For example, the second sealing portion 22 is welded to outer surfaces of the first sealing portions 21 by heat at the time of the injection molding.

The first sealing portions 21 and the second sealing portion 22 form an inner space V between adjacent electrodes, and seal the inner space V. More specifically, the second sealing portion 22 seals a space between the bipolar electrodes 14 adjacent to each other along the stacking direction D, a space between the negative terminal electrode 18 and the bipolar electrode 14 which are adjacent to each other along the stacking direction D, and a space between the positive terminal electrode 19 and the bipolar electrode 14 which are adjacent to each other along the stacking direction D in combination with the first sealing portions 21. According to this, a plurality of the inner spaces V which are air-tightly separated from each other are formed between the bipolar electrodes 14 adjacent to each other, between the negative terminal electrode 18 and the bipolar electrode 14, and between the positive terminal electrode 19 and the bipolar electrode 14, respectively. For example, an electrolytic solution (not illustrated) including an alkali solution such as a potassium hydroxide aqueous solution is stored in the inner spaces V. The electrolytic solution is impregnated in the separator 13, the positive electrode 16, and the negative electrode 17.

A thickness adjustment member 30 is disposed in the electrode stacked body 11 of the power storage module 4 at a position of overlapping the first sealing portions 21 when viewed from the stacking direction D. The thickness adjustment member 30 adjusts the thickness T of the electrode stacked body 11 in the stacking direction D by adjusting the thickness of the thickness adjustment member 30 in the stacking direction D. In this embodiment, the "thickness of the electrode stacked body 11" represents the thickness of the entirety of the electrode stacked body 11 and all of the first sealing portions 21 coupled to the electrode stacked body 11 in the stacking direction D. The thickness adjustment member 30 is a film having a predetermined thickness in the stacking direction D, and is divided into a plurality of sheets in the stacking direction D. Specifically, the thickness adjustment member 30 is divided into two parts including a thickness adjustment member 30A and a thickness adjustment member 30B.

In this embodiment, the thickness adjustment members 30A and 30B have the same configuration. Specifically, each of the thickness adjustment members 30A and 30B has the same shape (that is, a rectangular frame shape) as the shape of the first sealing portions 21 when viewed from the stacking direction D. An outer edge and an inner edge of the thickness adjustment member 30A overlap an outer edge and an inner edge of each of the first sealing portions 21, respectively, when viewed from the stacking direction D. Similarly, an outer edge and an inner edge of the thickness adjustment member 30B overlap the outer edge and the inner edge of the first sealing portion 21, respectively, when viewed from the stacking direction D. The thickness adjustment members 30A and 30B have the same thickness.

The thickness adjustment members 30A and 30B are constituted by the same material. Specifically, the thickness adjustment members 30A and 30B are constituted by, for example, an alkali-resistant insulating resin, that is, the same material as in the first sealing portion 21. Examples of a constituent material of the thickness adjustment members 30A and 30B include polypropylene (PP), polyphenylene sulfide (PPS), modified polyphenylene ether (modified PPE), and the like.

In the electrode stacked body 11, the thickness adjustment members 30A and 30B are disposed at positions different from each other in the stacking direction D. The thickness adjustment member 30A is disposed near the negative terminal electrode 18 of the electrode stacked body 11 in the stacking direction D. In this embodiment, the thickness adjustment member 30A is disposed between the stacked body S and the negative terminal electrode 18 in the stacking direction D and at the peripheral edge portion 15c of the other surface 15b (inner surface) in the metal plate 15 of the negative terminal electrode 18. More specifically, the thickness adjustment member 30A is disposed between the peripheral edge portion 15c of the other surface 15b in the metal plate 15 of the negative terminal electrode 18, and the first sealing portion 21 (hereinafter, referred to as "first sealing portion 21A") provided at the peripheral edge portion 15c of the one surface 15a in the metal plate 15 of the bipolar electrode 14 adjacent to the negative terminal electrode 18 in the stacking direction D.

On the other hand, the thickness adjustment member 30B is disposed near the positive terminal electrode 19 of the electrode stacked body 11 in the stacking direction D. In this embodiment, the thickness adjustment member 30B is disposed between the stacked body S and the positive terminal electrode 19 in the stacking direction D, and on the first sealing portion 21 (hereinafter, referred to as "first sealing portion 21B") coupled to the peripheral edge portion 15c of the one surface 15a (inner surface) of the metal plate 15 of the positive terminal electrode 19. More specifically, the thickness adjustment member 30B is disposed between the first sealing portion 21B and the peripheral edge portion 15c of the other surface 15b of the metal plate 15 of the bipolar electrode 14 adjacent to the positive terminal electrode 19 in the stacking direction D.

Figure 3:
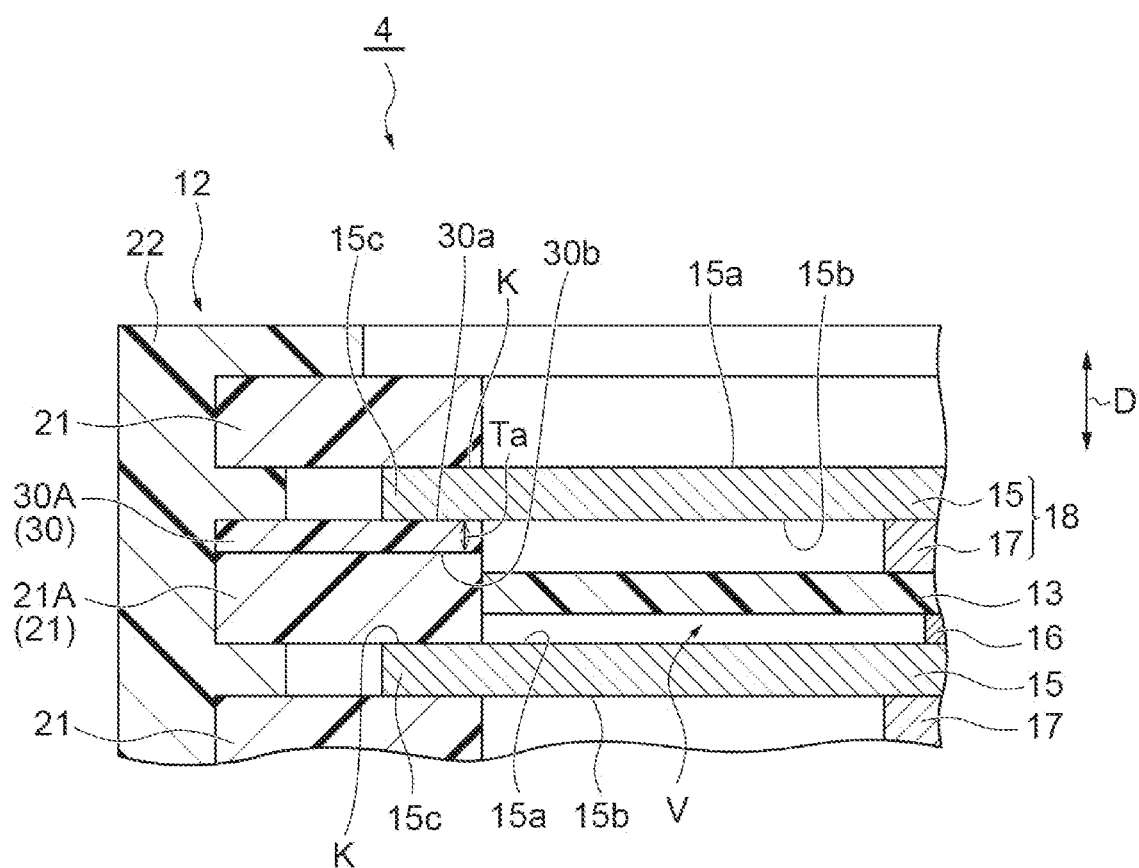
FIG. 3 is an enlarged cross-sectional view illustrating a part of the power storage module illustrated in FIG. 2.

Next, a configuration of the thickness adjustment member 30 will be described in more detail with reference to FIG. 3. FIG. 3 is an enlarged view illustrating the vicinity of the thickness adjustment member 30A of the power storage module 4. In this embodiment, as described above, the thickness adjustment members 30A and 30B have the same configuration. Accordingly, in the following description, a configuration of the thickness adjustment member 30A will be described in detail as a representative of the thickness adjustment members 30A and 30B. However, the configuration of the thickness adjustment member 30B will be described in a similar manner as in the thickness adjustment member 30A.

As illustrated in FIG. 3, the thickness adjustment member 30A includes one surface 30a and the other surface 30b on a side opposite to the one surface 30a. The one surface 30a faces the other surface 15b of the metal plate 15 of the negative terminal electrode 18 in the stacking direction D, and the other surface 30b faces the first sealing portion 21A in the stacking direction D. In this embodiment, the one surface 30a is in contact with the other surface 15b of the metal plate 15 of the negative terminal electrode 18, and the other surface 30b is in contact with one surface of the first sealing portion 21A in the stacking direction D. The one surface 30a is not coupled to the other surface 15b of the metal plate 15 of the negative terminal electrode 18, and the other surface 30b is not coupled to the one surface of the first sealing portion 21A. Accordingly, the thickness adjustment member 30A is not integrated with the first sealing portion 21A, and is configured separately from the first sealing portion 21A.

The thickness adjustment member 30A has a thickness (that is, a distance between the one surface 30a and the other surface 30b) Ta in the stacking direction D. The thickness adjustment member 30B also has the same thickness Ta as in the thickness adjustment member 30A. The thickness Ta is set in correspondence with the thickness of the electrode stacked body 11 before disposing the thickness adjustment members 30A and 30B. Specifically, in a measurement step before a secondary molding step to be described later, the thickness Ta is set in correspondence with a difference between a measurement value of the entire thickness of the stacked body in which respective electrodes are stacked (that is, the thickness of the electrode stacked body 11 before disposing the thickness adjustment members 30A and 30B), and the standard value of the thickness of the electrode stacked body 11. Specifically, the thickness Ta is set so that a total value (that is, a value that is two times the thickness Ta) of the thickness Ta of each of the thickness adjustment members 30A and 30B becomes the same as the difference.

For example, when the standard value of the thickness of the electrode stacked body 11 is 9 mm, and a measurement value of the thickness of the electrode stacked body 11 before disposing the thickness adjustment members 30A and 30B is 8.9 mm, a difference between the standard value and the measurement value is 0.1 mm. In this case, when the thickness Ta is set to 0.05 mm, the sum of the thicknesses Ta of the thickness adjustment members 30A and 30B becomes 0.1 mm, and becomes the same as the difference. Accordingly, when disposing the thickness adjustment members 30A and 30B having the thickness Ta in the electrode stacked body 11, the thickness T of the electrode stacked body 11 after disposing the thickness adjustment members 30A and 30B can be made to be close to 9 mm that is the standard value.

Next, an example of a method for manufacturing the power storage module 4 will be described. The method for manufacturing the power storage module 4 includes a primary molding step, a measurement step, a stacking step, a secondary molding step, a secondary molding step, and an injection step. In the primary molding step, a predetermined number of the bipolar electrodes 14, the negative terminal electrode 18, and the positive terminal electrode 19 are prepared, and the first sealing portion 21 is welded to the one surface 15a of the peripheral edge portion 15c of each of the metal plates 15. In addition, the first sealing portion 21 is also welded to the other surface 15b of the peripheral edge portion 15c of the metal plate 15 of the positive terminal electrode 19.

In the measurement step, the thickness of the bipolar electrodes 14, the thickness of the negative terminal electrode 18, and the thickness of the positive terminal electrode 19 are measured one by one. Here, the thickness of the bipolar electrodes 14 represents a total thickness of the bipolar electrodes 14 and the first sealing portions 21 welded to the one surface 15a of the metal plates 15 of the bipolar electrodes 14. The thickness of the negative terminal electrode 18 represents the total thickness of the negative terminal electrode 18 and the first sealing portion 21 welded to the one surface 15a of the metal plate 15 of the negative terminal electrode 18. The thickness of the positive terminal electrode 19 represents the total thickness of the positive terminal electrode 19 and the first sealing portions 21 welded to the one surface 15a and the other surface 15b of the metal plate 15 of the positive terminal electrode 19.

Next, the thickness of the entirety of the stacked body in which respective electrodes are stacked is calculated from the measurement result of the thickness of the respective electrodes in the measurement step. The thickness of the stacked body corresponds to the thickness of the electrode stacked body 11 formed in the subsequent stacking step. In addition, a difference between the calculated thickness of the stacked body, and the standard value of the thickness of the electrode stacked body 11 is calculated. Next, the thickness Ta of each of the thickness adjustment members 30A and 30B is set in correspondence with the difference. Specifically, the thickness Ta is set to a value that is equal to approximately the half of the difference. In addition, the thickness adjustment members 30A and 30B having the thickness Ta that is set as described above are prepared.

In stacking step, the bipolar electrodes 14 are stacked through the separator 13 along the stacking direction D. Then, the thickness adjustment member 30A prepared in the measurement step is disposed at the peripheral edge portion 15c of the other surface 15b in the metal plate 15 of the negative terminal electrode 18. In addition, the thickness adjustment member 30B prepared in the measurement step is disposed at the first sealing portion 21B welded to the peripheral edge portion 15c of the one surface 15a in the metal plate 15 of the positive terminal electrode 19. Then, the negative terminal electrode 18 in which the thickness adjustment member 30A is disposed is stacked on one outer side of the stacked body S in which the bipolar electrodes 14 are stacked in the stacking direction D, and the positive terminal electrode 19 in which the thickness adjustment member 30B is disposed is stacked on the other outer side of the stacked body S in the stacking direction D. According to this, the electrode stacked body 11 in which the thickness adjustment members 30A and 30B are disposed is formed.

In the secondary molding step, the electrode stacked body 11 formed in the stacking step is disposed inside an injection molding mold (not illustrated). Next, a molten resin is injected into the mold to form the second sealing portion 22 so as to surround the electrode stacked body 11 and the first sealing portions 21 welded to the electrode stacked body 11. According to this, the sealing body 12 is formed on the side surface 11a of the electrode stacked body 11. In the injection step, an electrolytic solution is injected to the inner space V between the bipolar electrodes 14 after the secondary molding step. According to this, the power storage module 4 is obtained.

Next, an operational effect of the power storage module 4 will be described. In the power storage module 4 of this embodiment, as described above, the thickness adjustment members 30A and 30B which adjust the thickness T of the electrode stacked body 11 are disposed. Since the thickness T of the electrode stacked body 11 is adjusted by the thickness adjustment members 30A and 30B, when forming the second sealing portion 22, the thickness T of the electrode stacked body 11 can be easily set within the standard. In addition, since the thickness adjustment members 30A and 30B are disposed at positions of overlapping the first sealing portions 21 when viewed from the stacking direction D, even after disposing the thickness adjustment members 30A and 30B, a shape of the entirety of the electrode stacked body 11 including the first sealing portions 21 can be maintained. According to this, occurrence of a molding failure of the second sealing portion 22 can be suppressed, and occurrence of a sealing failure of the electrode stacked body 11 can be suppressed. In addition, since the thickness adjustment members 30A and 30B are disposed at positions of overlapping the first sealing portions 21 when viewed from the stacking direction D, the thickness adjustment members 30A and 30B and the first sealing portions 21 can be set to the same shape when viewed from the stacking direction D. As a result, when forming the thickness adjustment members 30A and 30B and the first sealing portions 21 by punching, punching dies of the thickness adjustment members 30A and 30B and the first sealing portions 21 can be made common to each other.

In the power storage module 4, the thickness adjustment members 30A and 30B are constituted by the same material as in the first sealing portions 21. According to this, since the material of the thickness adjustment members 30A and 30B and the material of the first sealing portions 21 can be made common to each other, simplification of the configuration of the power storage module 4 is realized.

In the power storage module 4, the thickness adjustment members 30A and 30B are disposed between the stacked body S and the negative terminal electrode 18, and between the stacked body S and the positive terminal electrode 19 in the stacking direction D, respectively. In this case, since the thickness adjustment members 30A and 30B can be disposed when stacking the negative terminal electrode 18 and the positive terminal electrode 19 on the stacked body S of the bipolar electrodes 14, disposition of the thickness adjustment members 30A and 30B to the electrode stacked body 11 becomes easy. In this embodiment, the thickness and the number of sheets of the thickness adjustment member 30A are equal to the thickness and the number of sheets of the thickness adjustment member 30B. However, the thickness T of the electrode stacked body 11 can be finely adjusted by adjusting the thickness and the number of sheets of the thickness adjustment member 30A disposed between the stacked body S and the negative terminal electrode 18 and the thickness and the number of sheets of the thickness adjustment member 30B disposed between the stacked body S and the positive terminal electrode 19, respectively.

In the power storage module 4, the thickness adjustment member 30A disposed between the stacked body S and the negative terminal electrode 18 is disposed at the peripheral edge portion 15c of the other surface 15b in the metal plate 15 of the negative terminal electrode 18. The thickness adjustment member 30B disposed between the stacked body S and the positive terminal electrode 19 is disposed at the first sealing portion 21B coupled to the peripheral edge portion 15c of the one surface 15a in the metal plate 15 of the positive terminal electrode 19. In this case, since each of the thickness adjustment members 30A and 30B is interposed between the first sealing portions 21 adjacent to each other, occurrence of a positional deviation between each of the thickness adjustment members 30A and 30B and the first sealing portions 21 can be suppressed.

In the power storage module 4, the thickness Ta of the thickness adjustment member 30A disposed between the stacked body S and the negative terminal electrode 18 and the thickness Ta of the thickness adjustment member 30B disposed between the stacked body S and the positive terminal electrode 19 are the same as each other. In this case, fine adjustment of the thickness T of the electrode stacked body 11, and simplification of the configuration of the power storage module 4 can be compatible with each other. In addition, the inner space close to the negative terminal electrode 18 of the electrode stacked body 11, and the inner space close to the positive terminal electrode 19 of the electrode stacked body 11 can be made even. As a result, a change of the inner space between respective electrodes in the electrode stacked body 11 can be suppressed to the minimum, and a deviation in state of charge (SOC) between the respective electrodes can be reduced.

Hereinbefore, description has been given of the first embodiment of the present invention, but the present invention is not limited to the first embodiment, and various modifications can be made. For example, various modification aspects illustrated in FIG. 4 and FIG. 5 may be employed.

Figure 4:
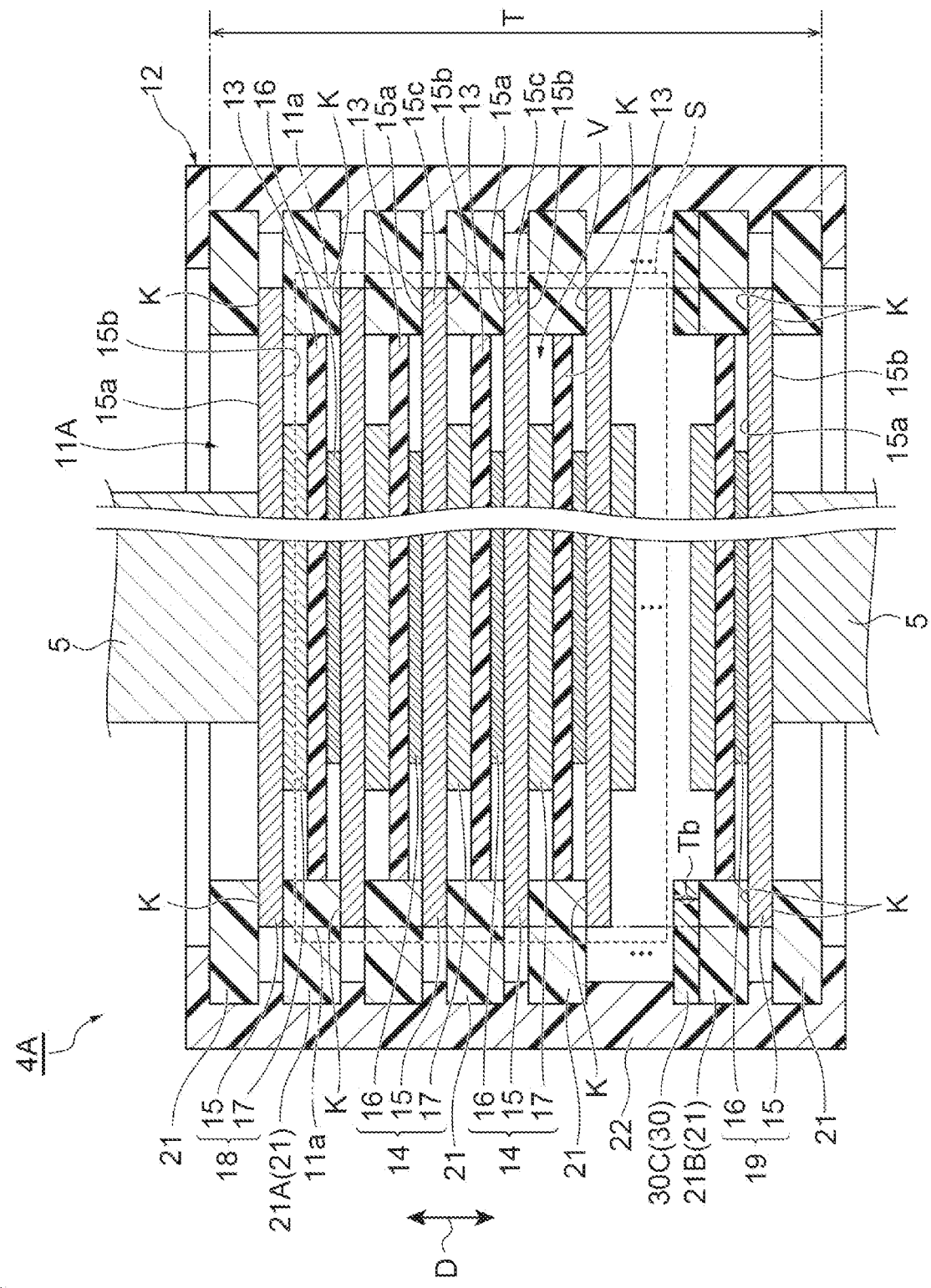
FIG. 4 is a schematic cross-sectional view illustrating an internal configuration of a power storage module according to a first modification example of the first embodiment.

FIG. 4 is a schematic cross-sectional view illustrating an internal configuration of a power storage module 4A according to a first modification example of the first embodiment. A difference between this modification example and the first embodiment is a configuration of the thickness adjustment member. That is, in the first embodiment, the thickness adjustment member 30 is divided into the thickness adjustment members 30A and 30B in the stacking direction D. However, in this modification example, a thickness adjustment member 30C is not divided in the stacking direction D, and is integrally formed (that is, one sheet of film). In this case, the thickness adjustment member 30C is disposed at any site between the stacked body S and the negative terminal electrode 18 and between the stacked body S and the positive terminal electrode 19.

In this modification example, the thickness adjustment member 30C is disposed between the stacked body S and the positive terminal electrode 19. Specifically, the thickness adjustment member 30C is disposed at the first sealing portion 21B coupled to the peripheral edge portion 15c of the one surface 15a (inner surface) in the metal plate 15 of the positive terminal electrode 19. More specifically, the thickness adjustment member 30C is disposed between the first sealing portion 21B and the peripheral edge portion 15c of the other surface 15b of the metal plate 15 of the bipolar electrode 14 adjacent to the positive terminal electrode 19 in the stacking direction D.

The thickness adjustment member 30C has the same configuration as in the thickness adjustment members 30A and 30B except that the thickness Tb of the thickness adjustment member 30C is different from the thickness Ta of each of the thickness adjustment members 30A and 30B. The thickness Tb of the thickness adjustment member 30C is greater than the thickness Ta of each of the thickness adjustment members 30A and 30B, and is equal to a total value of the thicknesses Ta. Accordingly, the thickness Tb is set to be equal to the difference between the measurement value of the thickness of the entirety of the stacked body in which the respective electrodes are stacked in the measurement step, and the standard value of the thickness of the electrode stacked body 11A.

In this modification example, since the thickness adjustment member 30C is disposed only between the stacked body S and the positive terminal electrode 19, the thickness T of the electrode stacked body 11A can be adjusted while avoiding an increase in the number of parts in comparison to the case of disposing the thickness adjustment members between the stacked body S and the negative terminal electrode 18 and between the stacked body S and the positive terminal electrode 19, respectively. In addition, the thickness adjustment member 30C is disposed at the first sealing portion 21B coupled to the peripheral edge portion 15c of the one surface 15a in the metal plate 15 of the positive terminal electrode 19. In this case, since the thickness adjustment member 30C is sandwiched between the first sealing portions 21 adjacent to each other, occurrence of a positional deviation between the first sealing portions 21 and the thickness adjustment member 30C can be suppressed.

In this modification example, description has been given of a case where the thickness adjustment member 30C is disposed only between the stacked body S and the positive terminal electrode 19. However, the thickness adjustment member 30C may be disposed only between the stacked body S and the negative terminal electrode 18. In this case, for example, the thickness adjustment member 30C is disposed at the peripheral edge portion 15c of the other surface 15b (inner surface) in the metal plate 15 of the negative terminal electrode 18. Specifically, the thickness adjustment member 30C is disposed between the other surface 15b of the peripheral edge portion 15c in the metal plate 15 of the negative terminal electrode 18, and the first sealing portion 21A coupled to the peripheral edge portion 15c of the one surface 15a in the metal plate 15 of the bipolar electrode 14 adjacent to the negative terminal electrode 18 in the stacking direction D. In this manner, even when the thickness adjustment member 30C is disposed only between the stacked body S and the negative terminal electrode 18, it is possible to obtain the same effect as when the thickness adjustment member 30C is disposed only between the stacked body S and the positive terminal electrode 19.

Figure 5:
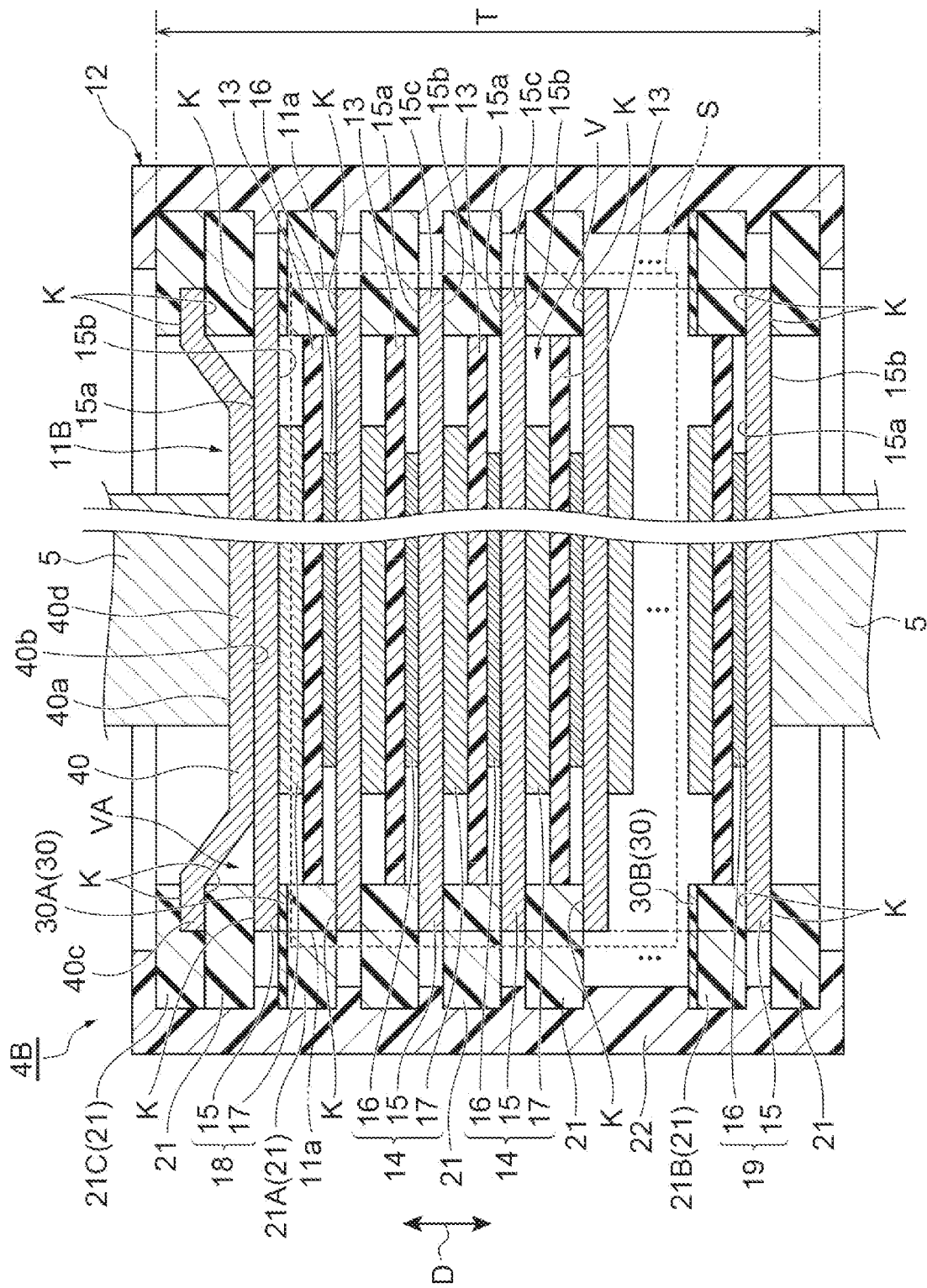
FIG. 5 is a schematic cross-sectional view illustrating an internal configuration of a power storage module according to a second modification example of the first embodiment.

FIG. 5 is a schematic cross-sectional view illustrating an internal configuration of a power storage module 4B according to a second modification example of the first embodiment. A difference between this modification example and the first embodiment is a configuration of the electrode stacked body. That is, in this modification example, in an electrode stacked body 11B, an outermost metal plate 40 is further stacked on an outer side of the negative terminal electrode 18 in the stacking direction D. The outermost metal plate 40 is constituted by the same material as the material of the metal plate 15 of the bipolar electrode 14. The positive electrode active material and the negative electrode active material are not coated on one surface 40a and the other surface 40b of the outermost metal plate 40, and an entire surface of the one surface 40a and the other surface 40b is set as an uncoated region. In this embodiment, the one surface 40a constitutes one outer surface of the electrode stacked body 11B in the stacking direction D.

A peripheral edge portion 40c of the other surface 40b of the outermost metal plate 40 is welded to the first sealing portion 21 provided in the peripheral edge portion 15c of the metal plate 15 of the negative terminal electrode 18, for example, by ultrasonic waves or heat, and is air-tightly coupled thereto. As in the bipolar electrodes 14 and the negative terminal electrode 18, the first sealing portion 21 (hereinafter, referred to as "first sealing portion 21C") is provided in the peripheral edge portion 40c of the one surface 40a of the outermost metal plate 40. An inner edge portion of the first sealing portion 21C overlaps the peripheral edge portion 40c of the one surface 40a of the outermost metal plate 40 when viewed from the stacking direction D, and is welded to the peripheral edge portion 40c, for example, by ultrasonic waves or heat, and is air-tightly coupled thereto. A central portion 40d of the outermost metal plate 40 is in contact with the one surface 15a of the metal plate 15 of the negative terminal electrode 18 in a state of being recessed toward the negative terminal electrode 18 by a constraining force applied to an inner side of the stacking direction D when constraining the module stacked body 2 by the constraining member 3. Due to the contact, the metal plate 15 of the negative terminal electrode 18 and the conductive structure body 5 adjacent to the power storage module 4B are electrically connected through the outermost metal plate 40.

At the peripheral edge portion 40c of the outermost metal plate 40, a region where the one surface 40a and the first sealing portion 21C overlap each other, and a region where the other surface 40b and the first sealing portion 21 provided in the peripheral edge portion 15c of the metal plate 15 of the negative terminal electrode 18 overlap each other are set as a coupling region K between the outermost metal plate 40 and the first sealing portion 21. In the electrode stacked body 11B, a surplus space VA in which the electrolytic solution is not stored is formed between the outermost metal plate 40 and the negative terminal electrode 18. The surplus space VA is surrounded by the one surface 15a of the metal plate 15 of the negative terminal electrode 18, the other surface 40b of the outermost metal plate 40, and the first sealing portion 21 coupled to the peripheral edge portion 15c of the one surface 15a in the metal plate 15 of the negative terminal electrode 18.

There is a concern that the alkali electrolytic solution stored in the inner space V may pass through between the metal plate 15 of the negative terminal electrode 18 and the first sealing portion 21 coupled to the metal plate 15 due to a so-called alkali creep phenomenon and may bleed to the outside of the power storage module 4B. Here, in this modification example, since the outermost metal plate 40 is disposed on an outer side of the metal plate 15 of the negative terminal electrode 18 in the stacking direction D, the surplus space VA is formed on a movement route of the alkali electrolytic solution. When the surplus space VA is formed, it is possible to suppress moisture contained in the external air from entering a gap between the metal plate 15 of the negative terminal electrode 18 and the first sealing portion 21 coupled to the metal plate 15 as a starting point of bleeding of the alkali electrolytic solution. As a result, it is possible to suppress an influence of external humidity that becomes an acceleration condition of the alkali creep phenomenon, and it is possible to suppress bleeding of the alkali electrolytic solution to the outside of the power storage module 4B.

In the present invention, other various modifications can be made. For example, the first embodiment and the respective modification examples can be combined in correspondence with a necessary object and a necessary effect. In addition, the configuration and the disposition aspect of the thickness adjustment member can be appropriately changed. For example, the thickness adjustment member may have a shape different from the shape of the first sealing portion 21 when viewed from the stacking direction D, or may be constituted by a material different from the material of the first sealing portion 21. The thickness adjustment member between the stacked body S and the negative terminal electrode 18 may be disposed at the first sealing portion 21 coupled to the peripheral edge portion 15c of the one surface 15a (that is, an outer surface) in the metal plate 15 of the negative terminal electrode 18. The thickness adjustment member between the stacked body S and the positive terminal electrode 19 may be disposed at the first sealing portion 21 coupled to the peripheral edge portion 15c of the other surface 15b (that is, an outer surface) in the metal plate 15 of the positive terminal electrode 19.

In addition, in the first embodiment, the thickness adjustment members 30A and 30B have the same configuration. However, the thickness adjustment members 30A and 30B may have configurations different from each other. For example, the thickness adjustment members 30A and 30B may be constituted by materials different from each other, or may have shapes different from each other. For example, the thickness adjustment members 30A and 30B may have thicknesses different from each other, or may have shapes different from each other when viewed from the stacking direction. In the measurement step of the first embodiment, the thickness of the bipolar electrodes 14, the thickness of the negative terminal electrode 18, and the thickness of the positive terminal electrode 19 are measured one by one. However, the thickness of the bipolar electrodes 14, the thickness of the negative terminal electrode 18, and the positive terminal electrode 19 may be measured at a time in a state of being actually stacked.

Second Embodiment

Next, a power storage module 400 according to a second embodiment will be described with reference to FIG. 6. The second embodiment is different from the first embodiment in that outermost metal plates (conductive plates) 40 and 50 are disposed on an outer side of the positive terminal electrode 19 in the stacking direction D, and an outer side of the negative terminal electrode 18 in the stacking direction D, respectively, and a thickness adjustment member 30 is located between the negative terminal electrode 18 and the outermost metal plate 50 in the stacking direction D. In the following second embodiment, description of portions redundant to the first embodiment will be appropriately omitted. Accordingly, hereinafter, portions different from the first embodiment will be mainly described.

Figure 6:
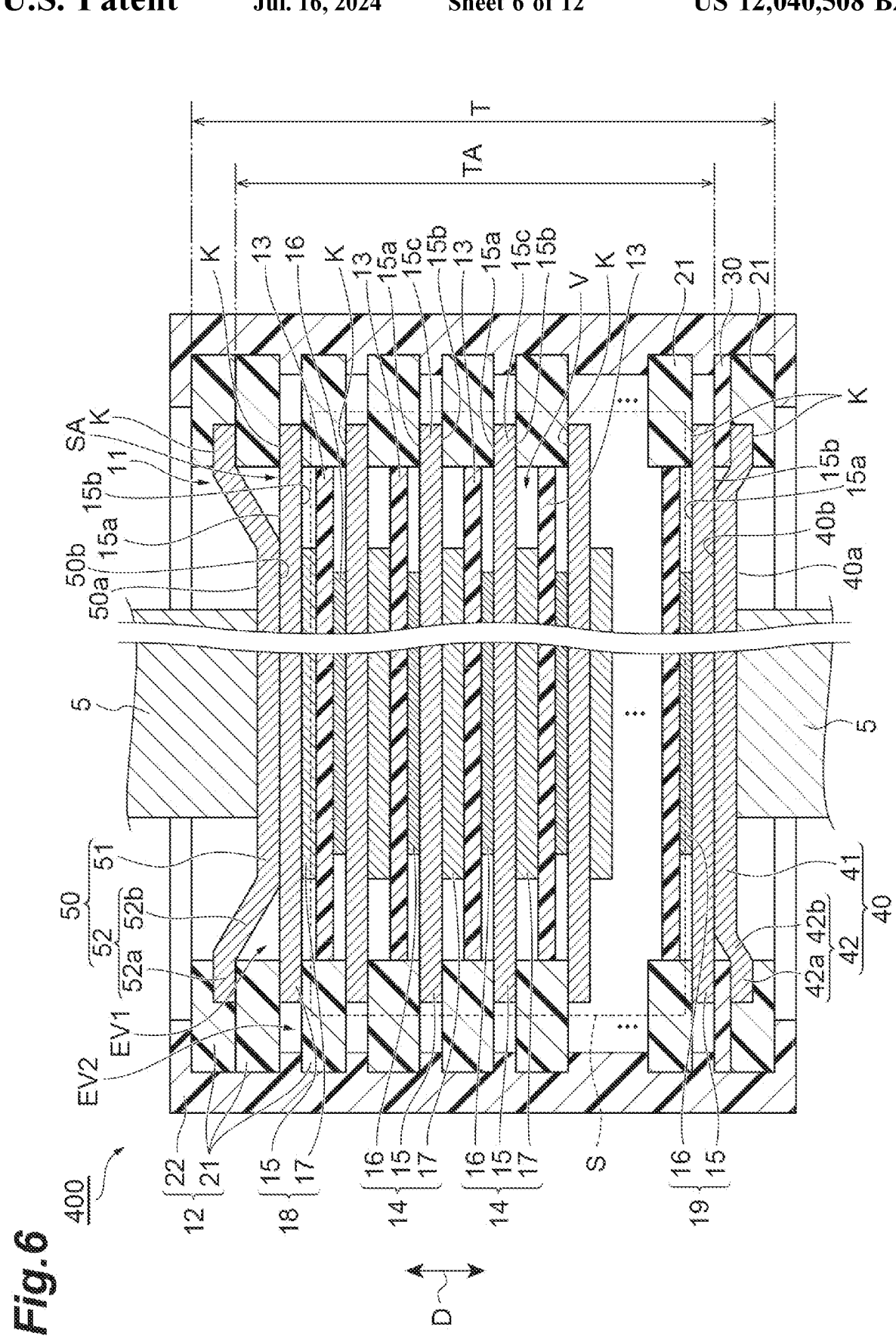
FIG. 6 is a schematic cross-sectional view illustrating an internal configuration of a power storage module according to a second embodiment.

FIG. 6 is a schematic cross-sectional view illustrating an internal configuration of the power storage module 400 according to the second embodiment. As illustrated in FIG. 6, the power storage module 400 includes an electrode stacked body 11, the thickness adjustment member 30 that is located at the electrode stacked body 11, and a sealing body 12 that integrates the electrode stacked body 11 and the thickness adjustment member 30. Although not illustrated, an electrolytic solution is stored in the power storage module 400 (details thereof will be described later).

The electrode stacked body 11 includes a stacked body S including bipolar electrodes 14 and separators 13 which are alternately stacked along a stacking direction D, the negative terminal electrode 18 located at one end of the stacked body S in the stacking direction D, and the positive terminal electrode 19 located at the other end of the stacked body S in the stacking direction D. That is, a pair of terminal electrodes are located on an outer side of the stacked body S in the stacking direction D. In FIG. 6, the stacked body S includes the bipolar electrodes 14 and the separators 13 which are located within a region indicated by a broken line. In addition, the electrode stacked body 11 further includes the outermost metal plate 40 located on an outer side of the positive terminal electrode 19 in the stacking direction D, and the outermost metal plate 50 located on an outer side of the negative terminal electrode 18 in the stacking direction D.

The bipolar electrodes 14 and the separators 13 included in the stacked body S are stacked along the stacking direction D and have, for example, a rectangular shape in a plan view (that is, when viewed from the stacking direction D). Each of the separators 13 is disposed between the bipolar electrodes 14 adjacent to each other. Each of the bipolar electrodes 14 includes the metal plate 15 including one surface 15a and the other surface 15b on a side opposite to the one surface 15a, a positive electrode 16 provided on the one surface 15a, and a negative electrode 17 provided on the other surface 15b.

The metal plate 15 is a conductive body (current collector) having a plate shape that extends in a horizontal direction that intersects or is orthogonal to the stacking direction D, and has flexibility. Accordingly, the horizontal direction may be referred to as an extension direction of the metal plate 15. For example, the metal plate 15 is nickel foil, a steel plate subjected to plating, or a stainless steel plate that is subjected to plating. Examples of the steel plate include a cold rolled steel plate (SPCC or the like) defined in JIS G 3141:2005. Examples of the stainless steel plate include SUS304, SUS316, SUS316L, and the like defined in JIS G 4305:2015. For example, the thickness of the metal plate 15 is 0.1 μm to 1000 μm. When the metal plate 15 is the nickel foil, the nickel foil may be subjected to plating.

Next, a configuration of the outermost metal plates 40 and 50 will be described. The outermost metal plate 40 is a plate-shaped member provided for suppressing deterioration of the electrode stacked body 11, and has conductivity and flexibility. Any one of the one surface 40a and the other surface 40b of the outermost metal plate 40 is not coated with the positive electrode active material and the negative electrode active material. Accordingly, all surfaces of the one surface 40a and the other surface 40b are set as uncoated regions. That is, the outermost metal plate 40 is uncoated foil in which an active material layer is not formed. The one surface 40a is a surface that faces the conductive structure body 5 in the stacking direction D. The other surface 40b is a surface that is located on a side opposite to the one surface 40a and faces the electrode stacked body 11 in the stacking direction D. In this embodiment, the outermost metal plate 40 is located on an outer side of the positive terminal electrode 19 in the stacking direction D. Accordingly, the other surface 40b faces the positive terminal electrode 19. The outermost metal plate 40 is stacked in combination with other electrodes along the stacking direction D. According to this, the positive terminal electrode 19 is disposed between the outermost metal plate 40 and the bipolar electrode 14 along the stacking direction D. In other words, in the power storage module 400, the outermost metal plate 40 is provided on a further outer side of the positive terminal electrode 19.

The outermost metal plate 40 includes a central portion 41 that is in contact with the conductive structure body 5, and a rectangular annular peripheral edge portion 42 that surrounds the central portion 41 in a plan view. The central portion 41 and the peripheral edge portion 42 are continuous from each other. The central portion 41 of the outermost metal plate 40 is recessed toward the center of the electrode stacked body 11 and is pressed against the positive terminal electrode 19 due to the constraining force of the constraining member 3 which is applied to the electrode stacked body 11 through the conductive structure body 5. According to this, the central portion 41 becomes a contact portion that is in contact with the positive terminal electrode 19, and the outermost metal plate 40 can function as a positive electrode terminal in the power storage module 400. On the other hand, the peripheral edge portion 42 is a portion that is spaced apart from the positive terminal electrode 19. A part 42a of the peripheral edge portion 42 is a portion that is held by the sealing body 12 and the thickness adjustment member 30, and is located on an outer side of the electrode stacked body 11 in comparison to the central portion 41 in the stacking direction D. The other portion 42b of the peripheral edge portion 42 is a portion that connects the part 42a and the central portion 41, and is located closer to the center of the outermost metal plate 40 than the sealing body 12 in the horizontal direction.

The outermost metal plate 50 is uncoated foil having the same function as in the outermost metal plate 40. One surface 50a of the outermost metal plate 50 is a surface that faces the conductive structure body 5 in the stacking direction D. The other surface 50b is a surface that is located on a side opposite to the one surface 50a and faces the electrode stacked body 11 in the stacking direction D. In this embodiment, the outermost metal plate 50 is located on an outer side of the negative terminal electrode 18 in the stacking direction D. Accordingly, the other surface 50b faces the negative terminal electrode 18. The outermost metal plate 50 is stacked in combination with other electrodes along the stacking direction D. According to this, the negative terminal electrode 18 is disposed between the outermost metal plate 50 and the bipolar electrode 14 along the stacking direction D. In other words, in the power storage module 400, the outermost metal plate 50 is provided on a further outer side of the negative terminal electrode 18.

The outermost metal plate 50 includes a central portion 51 that is in contact with the conductive structure body 5, and a peripheral edge portion 52 that surrounds the central portion 51 in a plan view. The central portion 51 and the peripheral edge portion 52 are continuous from each other. As in the outermost metal plate 40, the central portion 51 of the outermost metal plate 50 is recessed toward the center of the electrode stacked body 11 and is pressed against the negative terminal electrode 18. According to this, the central portion 51 becomes a contact portion that is in contact with the negative terminal electrode 18, and the outermost metal plate 50 can function as a negative electrode terminal in the power storage module 400. A part 52a of the peripheral edge portion 52 is a portion that is held by the sealing body 12, and is located on an outer side of the electrode stacked body 11 in comparison to the central portion 51 in the stacking direction D. The other portion 52b of the peripheral edge portion 52 is a portion that connects the part 52a and the central portion 51.

As in the metal plate 15, for example, each of the outermost metal plates 40 and 50 is nickel foil, a steel plate subjected to plating, or a stainless steel plate that is subjected to plating. From the viewpoint of corrosion resistance, for example, each of the outermost metal plates 40 and 50 may be the nickel foil or the stainless steel plate subjected to plating. In addition, from the viewpoint of the cost, each of the outermost metal plates 40 and 50 may be SUS316 or 316L subjected to plating. In this case, for example, a nickel plated layer (not illustrated) that functions as a surface protective layer is formed in each of the outermost metal plates 40 and 50. For example, the thickness of the nickel plated layer is 1 μm to 10 μm. The nickel plated layer can have a single layer structure or a multi-layer structure. For example, the nickel plated layer can have a base nickel plated layer, and main nickel plated layer. In the following description, the thickness T11 (refer to FIG. 7 to be described later) of the outermost metal plate 40 along the stacking direction D represents the thickness of the entirety of the outermost metal plate 40 and a first sealing portion 21 to be described later. That is, the thickness T11 of the outermost metal plate 40 represents the thickness of the entirety of the outermost metal plate 40 before deformation, and the first sealing portion 21 coupled to the outermost metal plate 40. Accordingly, for example, the thickness of the outermost metal plate 40 is 0.1 μm to 1000 μm, but the thickness T11 of the outermost metal plate 40 is not limited to the range. The thickness of the outermost metal plate 50 is defined as in the thickness T11 of the outermost metal plate 40.

The sealing body 12 is provided to surround the peripheral edge portion 15c of the metal plate 15, the part 42a of the peripheral edge portion 42 of the outermost metal plate 40, the part 52a of the peripheral edge portion 52 of the outermost metal plate 50, and the thickness adjustment member 30. For example, the sealing body 12 is formed from an insulating resin, and has a rectangular tubular shape as a whole. For example, the insulating resin is a thermoplastic resin having alkali resistance. Examples of the thermoplastic resin include PP, polyphenylene sulfide (PPS), modified polyphenylene ether (modified PPE), and the like. The sealing body 12 includes a plurality of first sealing portions 21 coupled to a plurality of the peripheral edge portions 15c of a plurality of the metal plates 15, the part 42a of the outermost metal plate 40, and the part 52a of the outermost metal plate 50, and a second sealing portion 22 that is disposed at the periphery of the first sealing portions 21.

The first sealing portions 21 resin members coupled to edge portions of the bipolar electrodes 14, the negative terminal electrode 18, the positive terminal electrode 19, and the outermost metal plates 40 and 50. Specifically, the first sealing portions 21 are rectangular frames coupled to the peripheral edge portion 42 of the outermost metal plate 40, the peripheral edge portion 52 of the outermost metal plate 50, and the peripheral edge portions 15c of the metal plates 15 included in the bipolar electrodes 14, the negative terminal electrode 18, and the positive terminal electrode 19. The first sealing portions 21 are continuously provided over the entire periphery of the corresponding peripheral edge portions 15c or the peripheral edge portions 42 and 52. According to this, the first sealing portion 21 has a rectangular frame shape when viewed from the stacking direction D. For example, each of the first sealing portions 21 is a resin film having a predetermined thickness in the stacking direction D. The first sealing portion 21 may be formed by punching a resin sheet, may be formed by arranging a plurality of resin sheets in a frame shape, or may be formed by injection molding using a mold. In this embodiment, the first sealing portion 21 is formed by punching a resin sheet. For example, the thickness of the first sealing portion 21 is 50 μm to 250 μm.

For example, an inner portion of the first sealing portion 21 in a plan view is welded to each of the peripheral edge portions 15c or the peripheral edge portions 42 and 52 by ultrasonic waves or heat. In this embodiment, the inner portion is welded to the one surface 15a of the peripheral edge portions 15c in the bipolar electrodes 14, the one surface 15a of the peripheral edge portion 15c in the negative terminal electrode 18, the one surface 15a of the peripheral edge portion 15c in the positive terminal electrode 19, the one surface 40a of the peripheral edge portion 42 in the outermost metal plate 40, and the one surface 50a of the peripheral edge portion 52 in the outermost metal plate 50. Each of the metal plates 15 and each of the first sealing portions 21 are air-tightly coupled. Similarly, each of the outermost metal plates 40 and 50 and the first sealing portion 21 are air-tightly coupled.

An outer portion of the first sealing portion 21 in a plan view is located on an outer side in comparison to the metal plate 15 in the horizontal direction. At least a part of the outer portion is held by the second sealing portion 22. The first sealing portions 21 adjacent to each other along the stacking direction D may be spaced apart from each other or may be in contact with each other. When the first sealing portions 21 adjacent to each other are in contact with each other, the first sealing portions 21 may be liquid-tightly and air-tightly welded to each other.

In the following description, a region where the metal plate 15 or the outermost metal plate 40, and the first sealing portion 21 are coupled to each other in the stacking direction D is set as a coupling region K. In each of the metal plates 15 and the outermost metal plate 40, a surface included at least in the coupling region K is roughened. In this embodiment, the entirety of the one surface 15a of the metal plates 15 included in the bipolar electrodes 14 and the negative terminal electrode 18, and the entirety of the metal plate 15 included in the positive terminal electrode 19, and the entirety of the one surface 40a of the outermost metal plate 40 are roughened.

The second sealing portion 22 is a member that constitutes an outer wall (that is, a housing) of the power storage module 400, and covers outer surfaces (at least side surfaces) of the first sealing portions 21. For example, the second sealing portion 22 is formed by injection molding of a resin, and extends over the entire length of the electrode stacked body 11 along the stacking direction D. In addition, the second sealing portion 22 extends to the first sealing portion 21 that is coupled to the outermost metal plate 40 beyond the electrode stacked body 11 in the stacking direction D. The second sealing portion 22 has a rectangular tubular shape (that is, an annular shape) that extends with the stacking direction D set as an axial direction. For example, the second sealing portion 22 is welded to outer surfaces of the first sealing portions 21 by heat at the time of injection molding. According to this, the second sealing portion 22 couples the first sealing portions 21.

The first sealing portions 21 and the second sealing portion 22 form an inner space V inside the electrode stacked body 11 and seals the inner space V. Specifically, the second sealing portion 22 seals a space between the bipolar electrodes 14 adjacent to each other along the stacking direction D, a space between the negative terminal electrode 18 and the bipolar electrode 14 which are adjacent to each other along the stacking direction D, and a space between the positive terminal electrode 19 and the bipolar electrode 14 which are adjacent to each other along the stacking direction D in combination with the first sealing portions 21. According to this, the inner space V is formed by the electrode stacked body 11 and the sealing body 12. More specifically, a plurality of the inner spaces V which are air-tightly separated are formed between the bipolar electrodes 14 adjacent to each other, between the negative terminal electrode 18 and the bipolar electrode 14, and between the positive terminal electrode 19 and the bipolar electrode 14. For example, an aqueous solution-based electrolytic solution (an alkali electrolytic solution such as a potassium hydroxide aqueous solution, lithium hydroxide aqueous solution, and a mixed solution thereof as a specific example) is stored in the inner spaces V. The electrolytic solution is stored in the inner space V through a communication hole (not illustrated) provided in the first sealing portions 21. The electrolytic solution can be impregnated in the separator 13, the positive electrode 16, and the negative electrode 17. The communication hole is clogged, for example, a pressure adjustment valve after injection of the electrolytic solution. Note that, when being described as "a volume of an inner space", the description represents a volume including voids of the separator 13.

Here, the peripheral edge portion 52 of the outermost metal plate 50 is also welded to the first sealing portion 21 that is coupled to the negative terminal electrode 18. Accordingly, a surplus space EV1 (first surplus space) is formed by the negative terminal electrode 18 (specifically, the metal plate 15 of the negative terminal electrode 18), the first sealing portion 21 that is coupled to the negative terminal electrode 18, and the outermost metal plate 50. In other words, since the first sealing portion 21 coupled to the negative terminal electrode 18 is also coupled to the outermost metal plate 50, the surplus space EV1 is formed. Since the central portion 51 of the outermost metal plate 50 is recessed toward the negative terminal electrode 18, the surplus space EV1 is limited to be narrow.

The surplus space EV1 is formed to surround the periphery of the outermost metal plate 50. When viewed from a cross-section along the stacking direction D, the surplus space EV1 has an approximately triangular shape of which a height (that is, a dimension along the stacking direction D) decreases as going toward the central portion 51 from the first sealing portion 21. In this embodiment, the other surface 50b of the outermost metal plate 50 is welded to the first sealing portion 21 that is coupled to the negative terminal electrode 18 so as to secure air-tightness of the surplus space EV1. In addition, the power storage module 400 includes another surplus space EV2 (a second surplus space) in which the electrolytic solution is not stored. The surplus space EV2 is formed by the negative terminal electrode 18 (specifically, the metal plate 15 of the negative terminal electrode 18), the first sealing portion 21 coupled to the negative terminal electrode 18, the first sealing portion 21 coupled to the bipolar electrode 14, and the second sealing portion 22. The surplus space EV2 is formed to surround an edge of the metal plate 15 of the negative terminal electrode 18. When viewed from a cross-section along the stacking direction D, the surplus space EV2 has an approximately rectangular frame shape.

Next, a configuration of the thickness adjustment member 30 will be described. The thickness adjustment member 30 is a resin member for adjusting the thickness of the electrode stacked body 11 in the stacking direction D. In this embodiment, the thickness adjustment member 30 is located between the positive terminal electrode 19 and the outermost metal plate 40 and at a site overlapping the first sealing portion 21 in the stacking direction D. More specifically, the thickness adjustment member 30 is located between the positive terminal electrode 19 and the first sealing portion 21 coupled to the positive terminal electrode 19, and the part 42a of the peripheral edge portion 42 of the outermost metal plate 40 and the first sealing portion 21 coupled to the outermost metal plate 40. In addition, the thickness adjustment member 30 is in contact with the positive terminal electrode 19, the part 42a of the outermost metal plate 40, and the first sealing portion 21 coupled to the outermost metal plate 40. The thickness adjustment member 30 may be welded to at least any one of the metal plate 15 of the positive terminal electrode 19 and the outermost metal plate 40.

For example, the thickness adjustment member 30 has a rectangular frame shape in a plan view. In this embodiment, the shape of the thickness adjustment member 30 in a plan view is the same or substantially the same as the shape of the first sealing portion 21 in a plan view. In addition, in this embodiment, the thickness adjustment member 30 is disposed to overlap the first sealing portion 21 in the stacking direction D. Specifically, an outer edge of the thickness adjustment member 30 and an outer edge of the first sealing portion 21 are aligned with each other, and an inner edge of the thickness adjustment member 30 and an inner edge of the first sealing portion 21 are aligned with each other. The thickness adjustment member 30 is constituted by an insulating resin as in the sealing body 12. For example, the insulating resin is a thermoplastic resin having alkali resistance. Examples of the thermoplastic resin include PP, PPS, modified PPE, and the like. The resin that constitutes the thickness adjustment member 30 and the resin constitutes the sealing body 12 may be the same as each other or may be different from each other. In this embodiment, the thickness adjustment member 30 is constituted by the same material as in the first sealing portion 21. As in the first sealing portion 21, the thickness adjustment member 30 may be formed by punching a resin sheet, or may be formed by injection molding using a mold. In this embodiment, the thickness adjustment member 30 is formed by punching the resin sheet. In this case, a mold for forming the thickness adjustment member 30 and a mold for forming the first sealing portion 21 may be made common to each other. According to this, a shape of the thickness adjustment member 30 in a plan view and a shape of the first sealing portion 21 in a plan view match each other in a satisfactory manner. In addition, since the number of molds can be reduced, a reduction in the cost is also realized.

Figure 7:
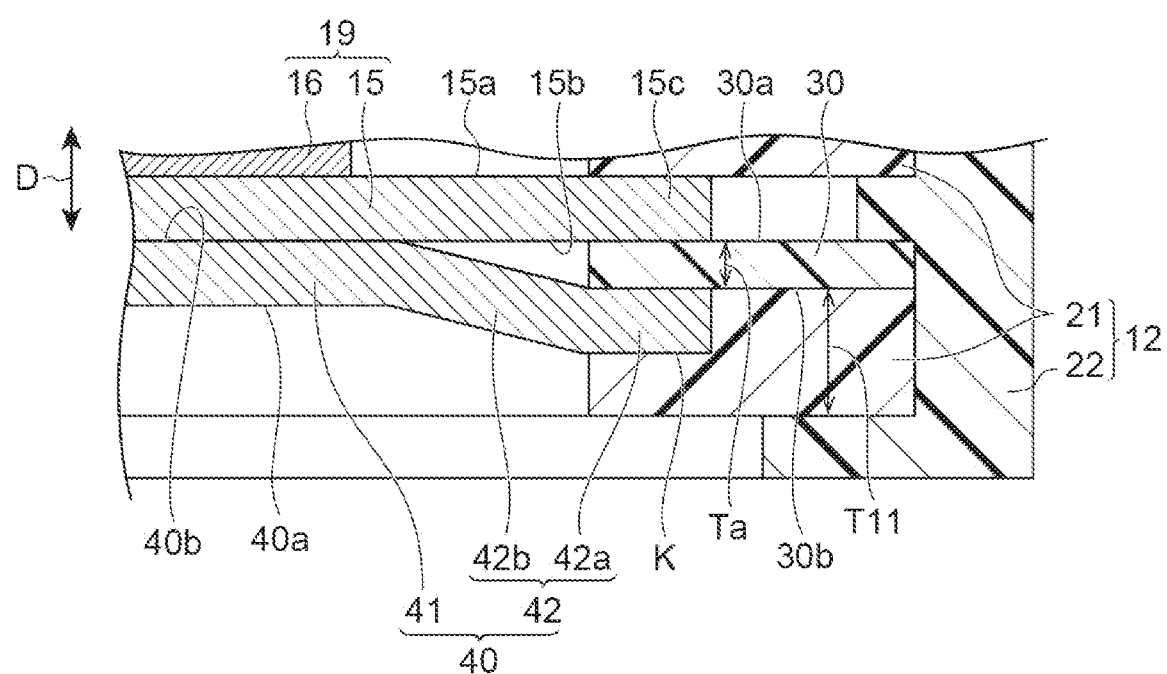
FIG. 7 is an enlarged view of a main section in FIG. 6.

Here, a detailed configuration of the thickness adjustment member 30 will be described with reference to FIG. 7. FIG. 7 is an enlarged view of a main section in FIG. 6. As illustrated in FIG. 7, the thickness adjustment member 30 includes one surface 30a, and the other surface 30b that is located on a side opposite to the one surface 30a in the stacking direction D. The one surface 30a is in contact with the positive terminal electrode 19. The other surface 30b is in contact with the part 42a of the peripheral edge portion 42 of the outermost metal plate 40, and the first sealing portion 21 coupled to the outermost metal plate 40. The one surface 30a is not coupled to the outermost metal plate 40. An inner portion of the thickness adjustment member 30 is in contact with the positive terminal electrode 19 and the outermost metal plate 40, and an outer portion of the thickness adjustment member 30 is in contact with the first sealing portion 21 coupled to the outermost metal plate 40. The outer portion may be in contact with the first sealing portion 21 coupled to the positive terminal electrode 19. In this embodiment, the thickness adjustment member 30 is configured separately from the first sealing portion 21. That is, the thickness adjustment member 30 and the first sealing portion 21 are not integrated. However, the thickness adjustment member 30 and the first sealing portion 21 may be joined to each other.

The thickness Ta of the thickness adjustment member 30 along the stacking direction D (that is, a distance between the one surface 30a and the other surface 30b along the stacking direction D) is set in correspondence with the thickness TA of a stacked body SA (refer to FIG. 6) along the stacking direction D. Here, the stacked body SA represents the electrode stacked body 11 before stacking the outermost metal plates 40 and 50, that is, the stacked body S in which the negative terminal electrode 18 and the positive terminal electrode 19 are stacked. For example, the thickness Ta is set in correspondence with a difference between a measurement value of the thickness TA of the stacked body SA and a standard value (that is, a standard thickness) of the thickness of the stacked body SA. For example, the standard thickness of the stacked body SA is within a range including an error of approximately ±0.2 mm (or approximately ±0.1 mm) from an ideal thickness of the stacked body SA, and is determined in advance. For example, when the standard thickness of the stacked body SA is 9 mm, and actual measurement value of the thickness TA of the stacked body SA before disposing the thickness adjustment member 30 is 8.9 mm, a difference between the standard thickness and the actual measurement value is 0.1 mm. In this case, the difference can be removed by using the thickness adjustment member 30 having a thickness of 0.1 mm. The thickness TA of the stacked body SA represents the thickness of the entirety of components including the first sealing portions 21 coupled to the bipolar electrodes 14 instead of a total thickness of only the separators 13 and the bipolar electrodes 14 which are stacked. In this manner, the thickness T of the electrode stacked body 11 including the outermost metal plates 40 and 50 can be adjusted by disposing the thickness adjustment member 30 corresponding to the difference between the thickness TA of the stacked body SA and the standard thickness of the stacked body SA.

The thickness Ta of the thickness adjustment member 30 may corresponds to a difference between a total value obtained by adding the thickness T11 of the outermost metal plate 40 to the thickness TA of the stacked body SA, and a total standard value obtained by adding the standard thickness of the outermost metal plate 40 to the standard thickness of the stacked body SA. In the total values, the thickness TA of the stacked body SA and the thickness T11 of the outermost metal plate 40 are actually measured values. As in the definition of the thickness T11 of the outermost metal plate 40, the standard thickness of the outermost metal plate 40 along the stacking direction D represents a standard thickness in the entirety of the outermost metal plate 40 and the first sealing portion 21 coupled to the outermost metal plate 40. For example, the standard thickness of the outermost metal plate 40 is within a range including an error of approximately ±50 μm from an ideal thickness of the outermost metal plate 40. For example, when a total standard value of the stacked body SA and the outermost metal plate 40 is 10 mm and a total value of the thickness TA of the stacked body SA and the thickness T11 of the outermost metal plate 40 is 9.8 mm, a difference between the total standard value and the total value is 0.2 mm. In this case, the difference can be removed by using the thickness adjustment member 30 having a thickness of 0.2 mm. Alternatively, for example, the difference can be reduced by using the thickness adjustment member 30 having a thickness of 0.15 mm.

The thickness TA of the stacked body SA and the thickness T11 of the outermost metal plate 40 may vary. The thickness adjustment member 30 may include a plurality of layered members stacked along the stacking direction D so as to cope with the variation. In this case, the thickness of the thickness adjustment member 30 can be changed in multi-stages by adjusting the number of the layered members. For example, the thickness of the layered members is 10 μm to 150 μm. In this case, breakage of the layered member can be suppressed in a satisfactory manner, and can cope with the variation in a satisfactory manner. The thicknesses of the layered members may be the same as each other or may be different from each other. When the thicknesses of the layered members are different from each other, the thickness of the thickness adjustment member 30 can be changed in further multi-stages by a combination of the layered members.

In this embodiment, the stacked body SA, and the outermost metal plates 40 and 50 overlap each other in the stacking direction D. According to this, the thickness Ta of the thickness adjustment member 30 may correspond to a difference between a total value obtained by adding the thickness T11 of the outermost metal plate 40 and the thickness of the outermost metal plate 50 to the thickness TA of the stacked body SA, and a total standard value obtained by adding the standard thicknesses of the outermost metal plates 40 and 50 to the standard thickness of the stacked body SA. The standard thickness of the outermost metal plate 50 along the stacking direction D is similar to the definition of the thickness T11 of the outermost metal plate 40. For example, the standard thickness of the outermost metal plate 50 is within a range including an error of approximately ±50 μm from the ideal thickness of the outermost metal plate 50.

In this embodiment, the stacked body SA is made thinner than the standard thickness of the stacked body SA. According to this, the thickness of the power storage module 400 can be reliably set within a predetermined range by using the thickness adjustment member 30.

Figure 8:
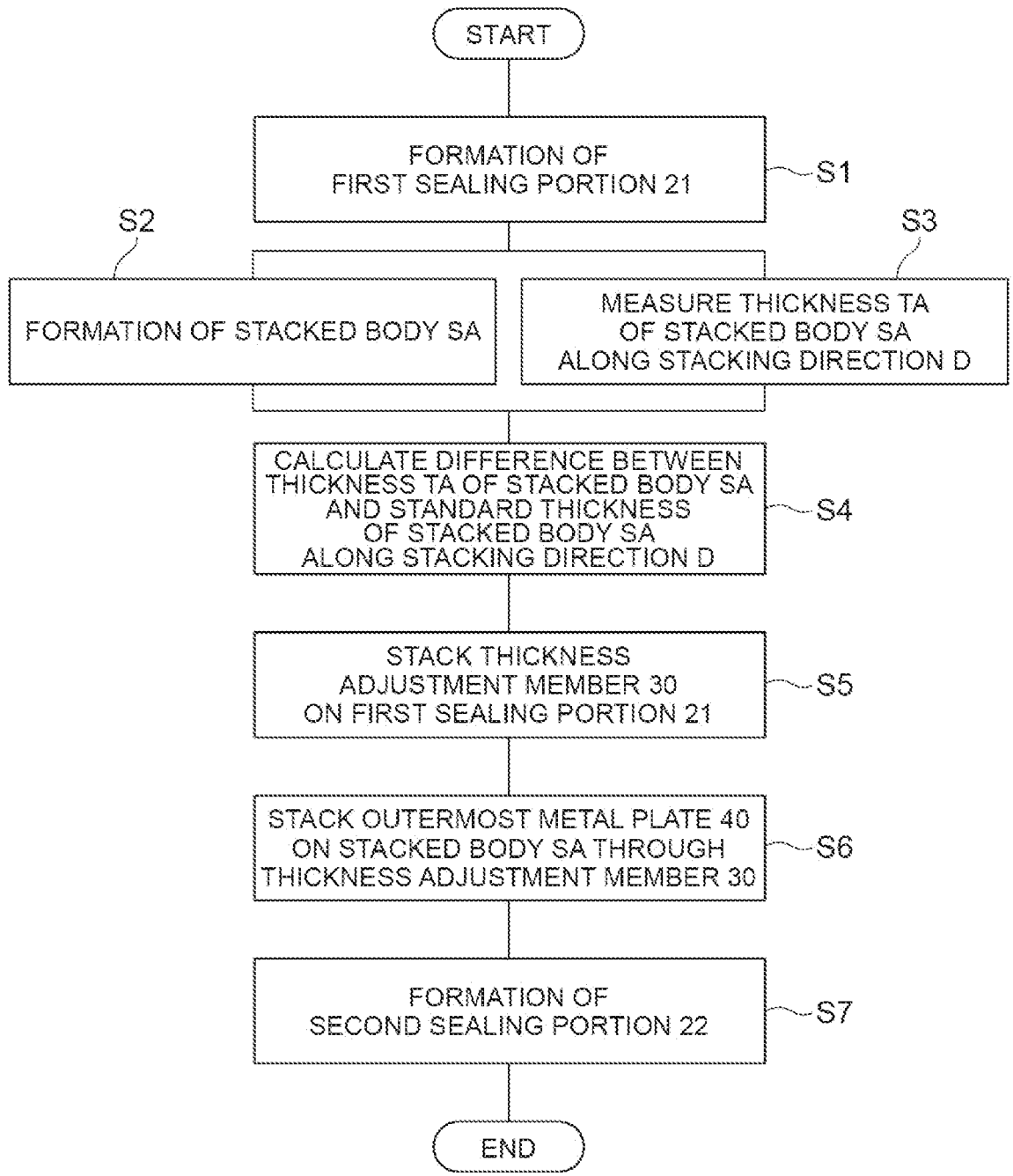
FIG. 8 is a flowchart illustrating a method for manufacturing the power storage module illustrated in FIG. 6.

Next, a method for manufacturing the power storage module 400 according to this embodiment will be described with reference to FIG. 8. FIG. 8 is a flowchart illustrating the method for manufacturing the power storage module 400.

As illustrated in FIG. 8, the first sealing portion 21 is molded with respect to the bipolar electrodes 14, the negative terminal electrode 18, the positive terminal electrode 19, and the outermost metal plates 40 and 50 (step S1). In step S1, first, the bipolar electrodes 14, the negative terminal electrode 18, the positive terminal electrode 19, and the outermost metal plates 40 and 50 are prepared. Next, the first sealing portions 21 is welded to the one surface 15a of the metal plates 15 included in the bipolar electrodes 14, the negative terminal electrode 18, and the positive terminal electrode 19, the one surface 40a of the outermost metal plate 40, and the one surface 50a of the outermost metal plate 50. According to this, the first sealing portion 21 is coupled to each of the bipolar electrodes 14, the negative terminal electrode 18, the positive terminal electrode 19, and the outermost metal plates 40 and 50.

Next, the stacked body SA is formed (step S2). In step S2, first, the bipolar electrodes 14 to which the first sealing portion 21 is coupled and the separators 13 are alternately stacked along the stacking direction D to form the stacked body S. Next, the negative terminal electrode 18 is disposed at one end of the stacked body S in the stacking direction D, and the positive terminal electrode 19 is disposed at the other end of the stacked body S in the stacking direction D. According to this, the stacked body SA is formed.

In addition, the thickness TA of the stacked body SA along the stacking direction D is measured (step S3). In this embodiment, steps S2 and S3 are simultaneously performed. According to this, the thickness TA of the stacked body SA is measured during formation of the stacked body SA. In step S3, the thickness TA may be always measured during formation of the stacked body SA, or the thickness TA may be intermittently.

Next, a difference between the measured thickness TA of the stacked body SA and the standard thickness of the stacked body SA along the stacking direction D is calculated (step S4). In step S4, for example, a device that measures the thickness TA of the stacked body SA performs comparison with the standard thickness stored in a memory or the like. According to this, the difference is calculated.

Next, the thickness adjustment member 30 having a thickness corresponding to the difference is stacked on the first sealing portion 21 in the stacking direction D (step S5). In step S5, the thickness adjustment member 30 is disposed on the first sealing portion 21 that is coupled to the positive terminal electrode 19. According to this, the difference is reduced or removed.

Next, the outermost metal plate 40 to which the first sealing portion 21 is coupled is stacked on the positive terminal electrode 19 through the thickness adjustment member 30 (step S6). In step S6, the first sealing portion 21 coupled to the outermost metal plate 40 is disposed on the thickness adjustment member 30. According to this, the thickness adjustment member 30 is located between the first sealing portion 21 coupled to the positive terminal electrode 19 and the first sealing portion 21 coupled to the outermost metal plate 40. In addition, in step S6, the outermost metal plate 50 to which the first sealing portion 21 is coupled is stacked on the negative terminal electrode 18. The outermost metal plate 50 is disposed on an outer side of the negative terminal electrode 18 in the stacking direction. According to this, the electrode stacked body 11 is formed.

Next, the second sealing portion 22 that is coupled to the respective first sealing portions 21 and the thickness adjustment member 30 is formed (step S7). In step S7, for example, a resin is injection-molded to outer periphery surfaces of the respective first sealing portions 21 and an outer peripheral surface of the thickness adjustment member 30 by using a mold. In addition, the resin is cured through cooling, thereby forming the second sealing portion 22. According to this, the sealing body 12 including the first sealing portions 21 and the second sealing portion 22 is formed. At this time, the outermost metal plate 40 may be welded to the thickness adjustment member 30, or the outermost metal plate 50 may be welded to the first sealing portion 21 coupled to the negative terminal electrode 18. Although not illustrated, after step S7, an electrolytic solution is injected into the respective inner spaces V. The power storage module 400 is manufactured through the above-described steps.

The power storage module 400 manufactured by the above-described manufacturing method according to this embodiment includes the thickness adjustment member 30 that adjusts the thickness of the power storage module 400 in the stacking direction D. The thickness adjustment member 30 is located between the positive terminal electrode 19 and the outermost metal plate 40, and at a site overlapping the first sealing portion 21 in the stacking direction D. Here, the thickness Ta of the thickness adjustment member 30 is set in correspondence with a difference between the measured thickness TA of the stacked body SA, and the standard thickness of the stacked body SA along the stacking direction D. Accordingly, at the time of manufacturing the power storage module 400, the thickness adjustment member 30 is disposed at the site before forming the second sealing portion 22. According to this, a total thickness of the electrode stacked body 11 and the thickness adjustment member 30 along the stacking direction D can be adjusted to the standard thickness determined in advance before forming the second sealing portion 22. Accordingly, when forming the second sealing portion 22, occurrence of a formation failure of the second sealing portion 22 can be suppressed.

As a result, it is possible to provide the power storage module 400 capable of suppressing occurrence of the sealing failure.

In addition, in this embodiment, the thickness adjustment member 30 is disposed on an outer side of the stacked body SA. In this case, an interval between the bipolar electrodes 14 in the stacked body SA can be set to be constant or approximately constant. According to this, a variation in the state of charge (SOC) in the bipolar electrodes 14 can be reduced.

In this embodiment, the thickness adjustment member 30 is in contact with the positive terminal electrode 19 and the outermost metal plate 40. In this case, since the positive terminal electrode 19 is protected from the external environment by the outermost metal plate 40, deterioration of the positive terminal electrode 19 can be suppressed. According to this, leakage of the electrolytic solution due to breakage of the positive terminal electrode 19 can be suppressed. In addition, the thickness adjustment member 30 is strongly fixed by the positive terminal electrode 19 and the outermost metal plate 40. Examples of deterioration of the positive terminal electrode 19 include corrosion (for example, rust) of the positive terminal electrode 19. For example, the corrosion of the positive terminal electrode 19 occurs in the metal plate 15 that is exposed from a defect of a plated layer. Examples of the breakage of the positive terminal electrode 19 include formation of a through-hole in accordance with progress of the corrosion.

In this embodiment, the electrode stacked body 11 includes the outermost metal plate 50 located on an outer side of the negative terminal electrode 18 in the stacking direction D. In this case, since the negative terminal electrode 18 is protected from an external environment by the outermost metal plate 50, deterioration of the negative terminal electrode 18 can be suppressed. According to this, leakage of the electrolytic solution due to breakage of the negative terminal electrode 18 can be suppressed. The deterioration and breakage of the negative terminal electrode 18 are similar to deterioration and breakage of the positive terminal electrode 19.

An alkali electrolytic solution is stored in the inner space V constituted by the electrode stacked body 11 and the sealing body 12, and the surplus space EV1 is formed by the negative terminal electrode 18, the first sealing portion 21 coupled to the negative terminal electrode 18, and the outermost metal plate 50. Here, in this embodiment, the thickness adjustment member 30 is located between the positive terminal electrode 19 and the outermost metal plate 40 in the stacking direction D, and is not located between the negative terminal electrode 18 and the outermost metal plate 50. According to this, even when using the thickness adjustment member 30, the shape and volume of the surplus space EV1 in the stacking direction D can be strictly defined. According to this, the amount of water vapor contained in the surplus space EV1 can be defined with accuracy. Accordingly, the amount of leakage of the electrolytic solution when an alkali creep phenomenon to be described later occurs can be defined in a satisfactory manner. In addition, since the thickness adjustment member 30 is not located between the negative terminal electrode 18 and the outermost metal plate 50, air-tightness of the surplus space EV1 can be secured. In addition, in this embodiment, the surplus space EV2 is formed by the negative terminal electrode 18, the first sealing portion 21 coupled to the negative terminal electrode 18, the first sealing portion 21 coupled to the bipolar electrode 14 adjacent to the negative terminal electrode 18 in the stacking direction D, and the second sealing portion 22.

In the power storage module 400, the electrolytic solution is transferred onto the metal plate 15 of the negative terminal electrode 18 due to the so-called alkali creep phenomenon, passes through a gap between the first sealing portion 21 and the negative terminal electrode 18, and thus the electrolytic solution may bleed out onto the one surface 15a of the metal plate 15. The alkali creep phenomenon can occur during charging, discharging, and no load of the power storage device due to an electrochemical factor, a fluid phenomenon, and the like. The alkali creep phenomenon is caused by the presence of a negative electrode potential, moisture, and a path for the electrolytic solution.

Examples of a movement route of the electrolytic solution which is assumed when the alkali creep phenomenon occurs in the power storage module 400 include a gap between the negative terminal electrode 18 and the first sealing portion 21 coupled to the bipolar electrode 14 adjacent to the negative terminal electrode 18, the surplus space EV2, a gap between the metal plate 15 of the negative terminal electrode 18 and the first sealing portion 21 coupled to the negative terminal electrode 18, the surplus space EV1, and a gap between the first sealing portion 21 coupled to the outermost metal plate 50 and the outermost metal plate 50. That is, both the surplus spaces EV1 and EV2 are provided on the movement route of the electrolytic solution due to the alkali creep phenomenon.

In this embodiment, the alkali electrolytic solution is stored in the inner space V. There is a concern that the alkali electrolytic solution may flow out to the outside of the power storage module 400 through a gap between the negative terminal electrode 18 and the first sealing portion 21 due to the so-called alkali creep phenomenon. In contrast, the power storage module 400 according to this embodiment includes the surplus spaces EV1 and EV2 in which the electrolytic solution is not stored on the movement route of the electrolytic solution. In this manner, since the surplus spaces EV1 and EV2 are provided on the movement route of the electrolytic solution, it is possible to suppress moisture in the air from entering the module from a gap between the negative terminal electrode 18 and the first sealing portion 21 which is the starting point of spreading of the electrolytic solution in a satisfactory manner. According to this, an influence of external humidity that becomes an acceleration condition of the alkali creep phenomenon is suppressed. Accordingly, bleeding of the electrolytic solution to the outside of the power storage module 400 is suppressed, and thus reliability of the power storage module 400 is improved.

In this embodiment, the thickness adjustment member 30 may include a plurality of layered members stacked along the stacking direction D. In this case, the thickness Ta of the thickness adjustment member 30 can be easily adjusted by changing the number of the layered members included in the thickness adjustment member 30. Accordingly, the thickness adjustment member 30 corresponding to the power storage module 400 can be easily prepared.

In this embodiment, the thickness adjustment member 30 may be constituted by the same material as in the first sealing portion 21. In this case, a reduction in the cost of the power storage module 400 can be realized.

In this embodiment, each of the thickness adjustment member 30 and a plurality of the first sealing portions 21 may contain an alkali-resistant thermoplastic resin. In this case, when forming the second sealing portion 22, the first sealing portions 21 and the thickness adjustment member 30, and the second sealing portion 22 can be coupled in a satisfactory manner.

In this embodiment, the thickness Ta of the thickness adjustment member 30 may correspond to a difference between a total value obtained by adding the thickness T11 of the outermost metal plate 40 to the thickness TA of the stacked body SA, and a total standard value obtained by adding the standard thickness of the outermost metal plate 40 along the stacking direction D to the standard thickness of the stacked body SA along the stacking direction D. In this case, the total thickness can be adjusted within a range of the total standard value with accuracy. In this embodiment, the thickness Ta of the thickness adjustment member 30 may correspond to a difference between a total value obtained by adding the thickness T11 of the outermost metal plate 40 and the thickness of the outermost metal plate 50 to the thickness TA of the stacked body SA, and a total standard value obtained by adding the standard thicknesses of the outermost metal plates 40 and 50 along the stacking direction D to the standard thickness of the stacked body SA along the stacking direction D. In this case, the total thickness can be adjusted within a range of the total standard value with more accuracy.

In this embodiment, step S2 of forming the stacked body SA and step S3 of measuring the thickness TA of the stacked body SA are simultaneously performed. According to this, time necessary for manufacturing the power storage module 400 can be shortened.

Here, respective modification examples of the second embodiment will be described with reference to FIG. 9 to FIG. 12. In the following modification example, description of a portion redundant to the second embodiment will be omitted. Accordingly, in the following description, a portion different from the second embodiment will be mainly described.

Figure 9:
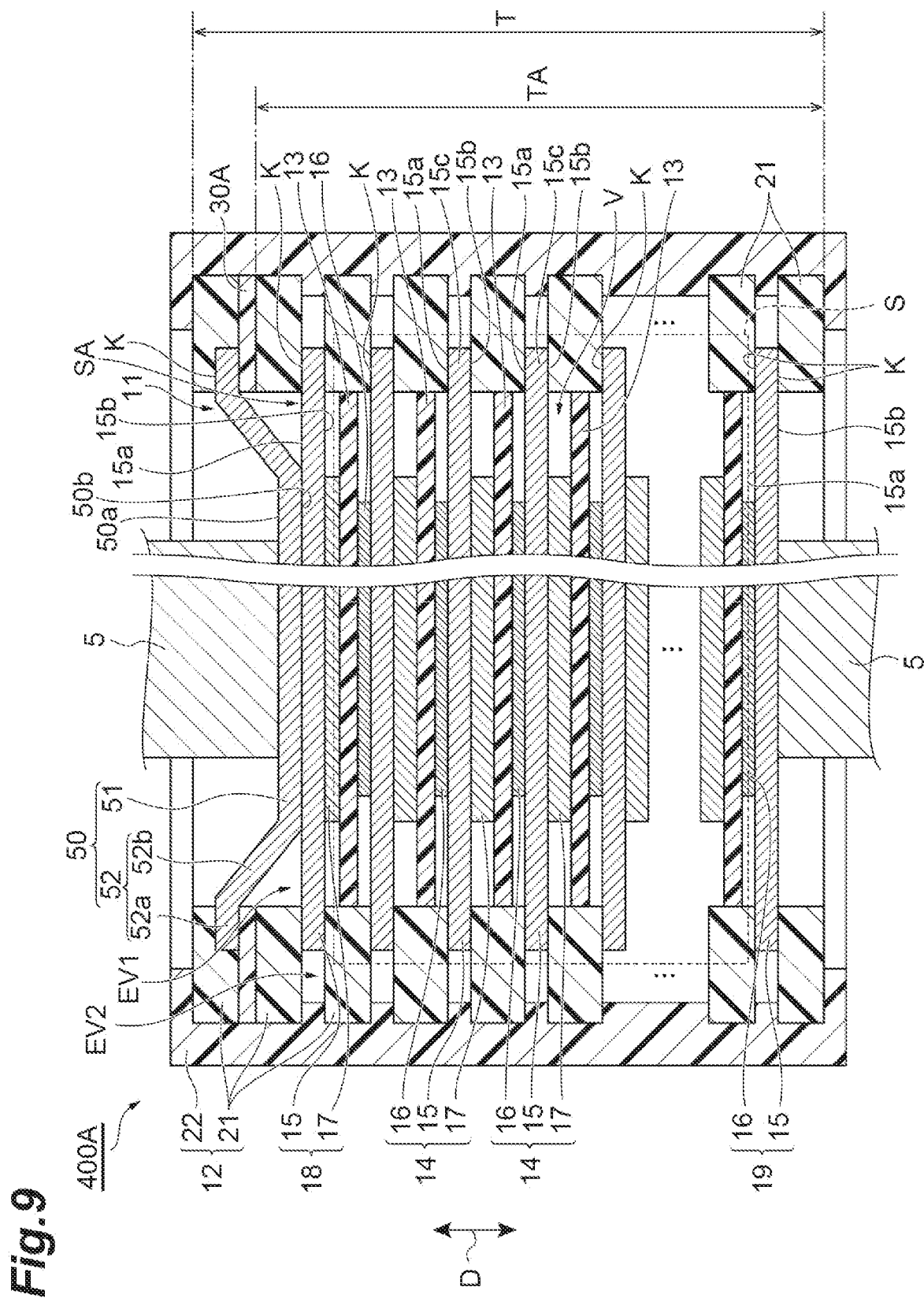
FIG. 9 is a schematic cross-sectional view illustrating an internal configuration of a power storage module according to a first modification example of the second embodiment.

FIG. 9 is a schematic cross-sectional view illustrating an internal configuration of a power storage module 400A according to a first modification example of the second embodiment. The power storage module 400A illustrated in FIG. 9 includes a thickness adjustment member 30A located on an outer side of the negative terminal electrode 18 in the stacking direction D. On the other hand, the power storage module 400A is not provided with the thickness adjustment member 30 and the outermost metal plate 40 located on an outer side of the positive terminal electrode 19 in the stacking direction D differently from the power storage module 400 according to the second embodiment. In addition, two first sealing portions 21 are coupled to the positive terminal electrode 19 included in the power storage module 400A. Specifically, first sealing portions 21 different from each other are coupled to the one surface 15a and the other surface 15b of the metal plate 15 included in the positive terminal electrode 19.

The thickness adjustment member 30A has the same configuration as in the thickness adjustment member 30 of the second embodiment. The thickness adjustment member 30A is located between the negative terminal electrode 18 and the outermost metal plate 50 in the stacking direction D, and overlaps the first sealing portion 21 in the stacking direction D. The thickness adjustment member 30A is in contact with the first sealing portion 21 coupled to the negative terminal electrode 18 and the outermost metal plate 50. The thickness adjustment member 30A and the negative terminal electrode 18 are spaced apart from each other. The thickness adjustment member 30A may include a plurality of layered members.

Even in the above-described power storage module 400A, since the thickness adjustment member 30A is used, when forming the second sealing portion 22, occurrence of a formation failure of the second sealing portion 22 can be suppressed. In addition, the thickness adjustment member 30A is strongly fixed by the negative terminal electrode 18 and the outermost metal plate 50.

In the power storage module 400A, the thickness adjustment member 30A is in contact with the outermost metal plate 50 and the first sealing portion 21 coupled to the negative terminal electrode 18, and the thickness adjustment member 30A and the negative terminal electrode 18 are spaced apart from each other. In this manner, since the thickness adjustment member 30A is spaced apart from the negative terminal electrode 18, the function exhibited by the thickness adjustment member 30A is less likely to be affected by the negative terminal electrode 18.

Figure 10:
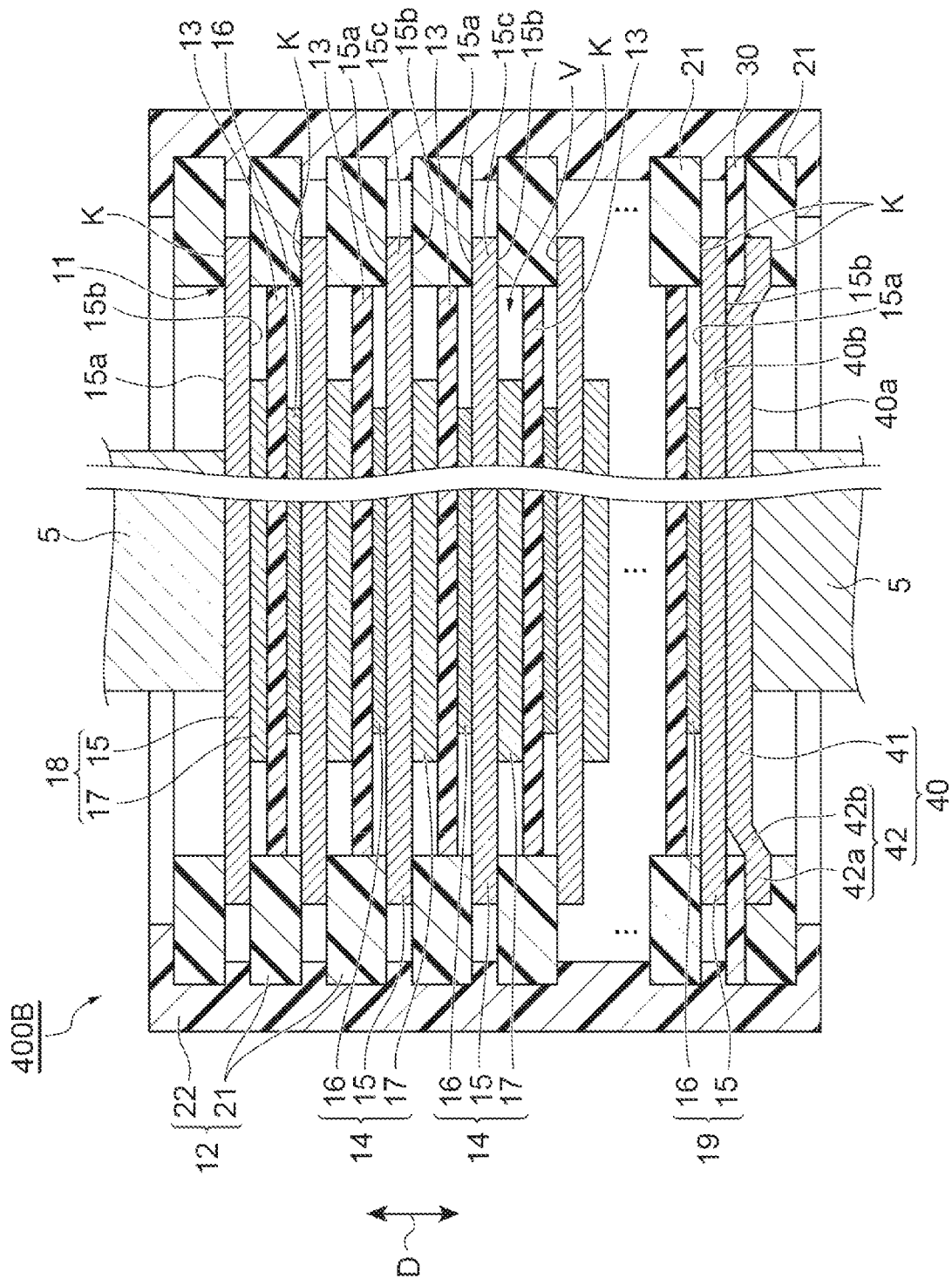
FIG. 10 is a schematic cross-sectional view illustrating an internal configuration of a power storage module according to a second modification example of the second embodiment.

FIG. 10 is a schematic cross-sectional view illustrating an internal configuration of a power storage module 400B according to a second modification example of the second embodiment. The power storage module 400B illustrated in FIG. 10 is not provided with the outermost metal plate 50 that is in contact with the negative terminal electrode 18 differently from the power storage module 400 according to the second embodiment. Even in the power storage module 400B, the same operational effect as in the second embodiment is exhibited by using the thickness adjustment member 30. In addition, in the power storage module 400B, since the outermost metal plate 50 is not used, a method for manufacturing the power storage module 400B can be simplified.

Figure 11:
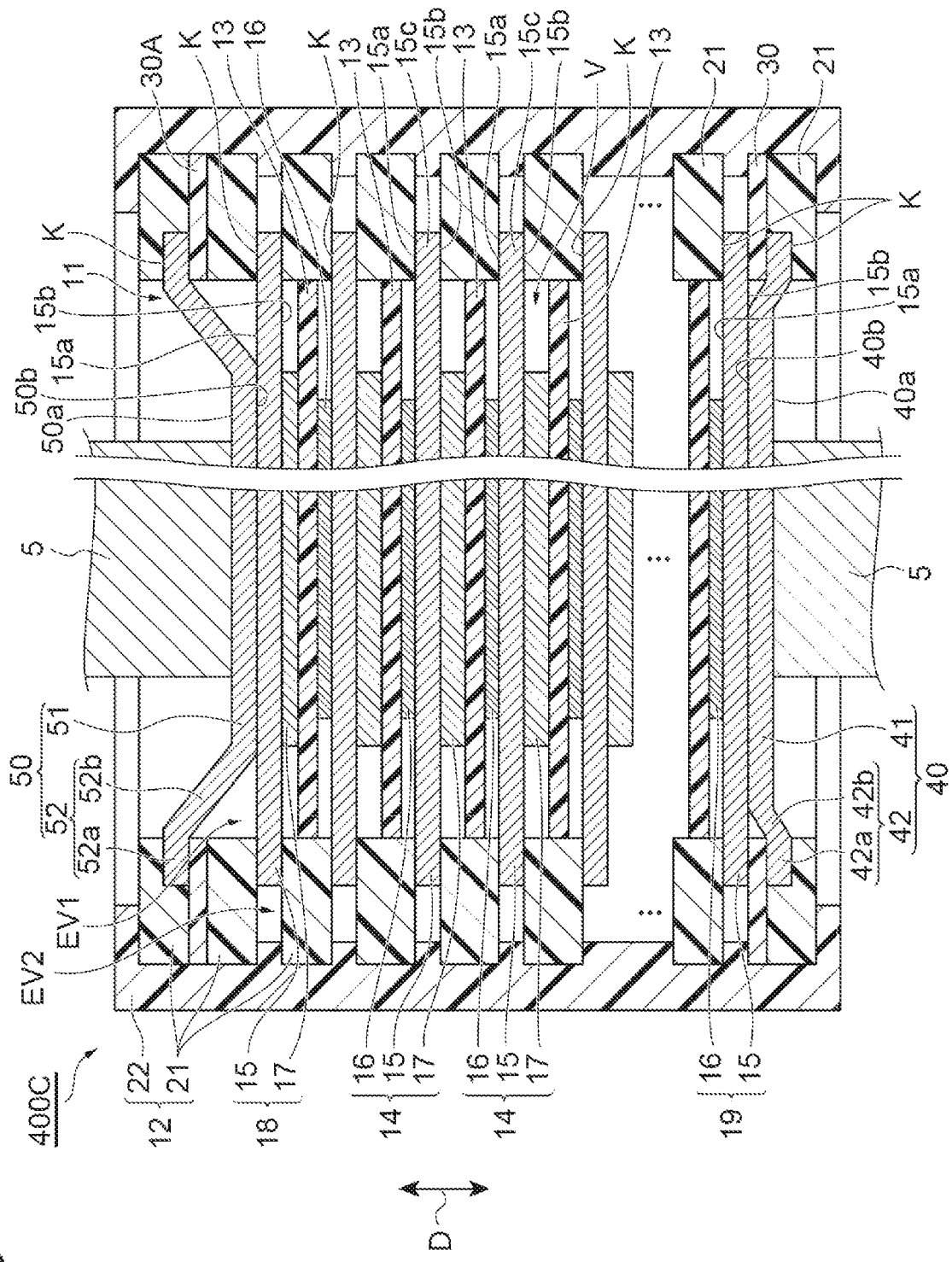
FIG. 11 is a schematic cross-sectional view illustrating an internal configuration of a power storage module according to a third modification example of the second embodiment.

FIG. 11 is a schematic cross-sectional view illustrating an internal configuration of a power storage module 400C according to a third modification example of the second embodiment. The power storage module 400C illustrated in FIG. 11 includes both the thickness adjustment members 30 and 30A. According to this, in the power storage module 400C, the thickness adjustment member 30 is located at one end portion of the electrode stacked body 11 in the stacking direction D, and the thickness adjustment member 30A is located at the other end portion of the electrode stacked body 11 in the stacking direction D. In addition, the thickness adjustment member 30 is sandwiched between the positive terminal electrode 19 and the outermost metal plate 40, and the thickness adjustment member 30A is sandwiched between the negative terminal electrode 18 and the outermost metal plate 50.

In the power storage module 400C, the first sealing portion 21 coupled to the negative terminal electrode 18 and the thickness adjustment member 30A are located between the peripheral edge portion 15c of the metal plate 15 of the negative terminal electrode 18, and the part 42a of the peripheral edge portion 42 of the outermost metal plate 40. According to this, a distance from the positive terminal electrode 19 to the part 42a of the outermost metal plate 40 along the stacking direction D may be different from a distance from the negative terminal electrode 18 to the part 52a of the outermost metal plate 50 along the stacking direction D. For example, the distance from the positive terminal electrode 19 to the part 42a of the outermost metal plate 40 is shorter than the distance from the negative terminal electrode 18 to the part 52a of the outermost metal plate 50. In this case, since a recessed distance of the positive terminal electrode 19 is shorter than a recessed distance of the negative terminal electrode 18, a region of the other portion 42b in the peripheral edge portion 42 of the outermost metal plate 40 can be narrowed. In addition, in a plan view, an area of the central portion 41 (second contact portion) of the outermost metal plate 40 can be enlarged in comparison to an area of the central portion 51 (first contact portion) of the outermost metal plate 50.

Even in the above-described power storage module 400C, the same operational effect as in the second embodiment is exhibited. In addition, a total thickness of the electrode stacked body 11 and the thickness adjustment members 30 and 30A along the stacking direction D can be adjusted to the standard thickness with accuracy before forming the second sealing portion 22.

Figure 12:
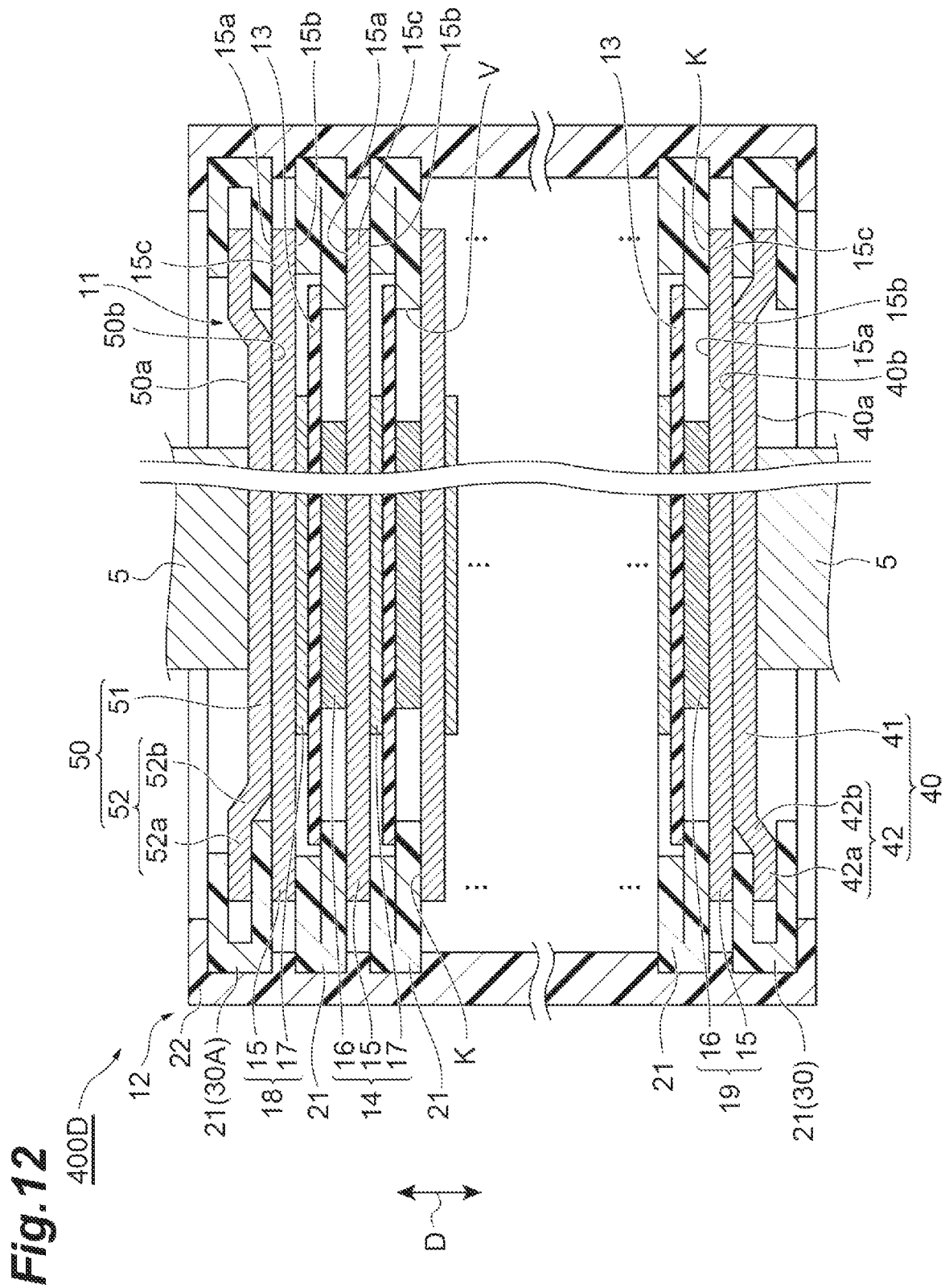
FIG. 12 is a schematic cross-sectional view illustrating an internal configuration of a power storage module according to a fourth modification example of the second embodiment.

FIG. 12 is a schematic cross-sectional view illustrating an internal configuration of a power storage module 400D according to a fourth modification example of the second embodiment. In the power storage module 400D illustrated in FIG. 12, the first sealing portion 21 is formed by folding back an outer edge portion of a film constituting the first sealing portion 21 to an inner side. In addition, the thickness adjustment member 30 is constituted by the first sealing portion 21 coupled to the outermost metal plate 40, and the thickness adjustment member 30A is constituted by the first sealing portion 21 coupled to the outermost metal plate 50. The first sealing portion 21 coupled to the outermost metal plate 40 sandwiches the peripheral edge portion 42 of the outermost metal plate 40 in the stacking direction D, and is in contact with the one surface 40a and the other surface 40b of the peripheral edge portion 42. The first sealing portion 21 that is in contact with the other surface 40b is also in contact with the other surface 15b of the metal plate 15 of the positive terminal electrode 19. The first sealing portion 21 coupled to the outermost metal plate 50 sandwiches the peripheral edge portion 52 of the outermost metal plate 50 in the stacking direction D, and is in contact with the one surface 50a and the other surface 50b of the peripheral edge portion 52. The first sealing portion 21 that is in contact with the other surface 50b is also in contact with the one surface 15a of the metal plate 15 of the negative terminal electrode 18.

In the power storage module 400D, as the first sealing portions 21 which are respectively coupled to the outermost metal plates 40 and 50, a plurality of kinds having different thickness are prepared. In addition, when stacking the outermost metal plates 40 and 50, the thickness of the first sealing portion 21 coupled to each of the outermost metal plates 40 and 50 is selected so that the thickness T of the electrode stacked body 11 becomes the standard thickness. According to this, the thickness T of the electrode stacked body 11 can be adjusted to the standard thickness that is determined in advance. Even in this aspect, the same effect as in the second embodiment can be exhibited. Note that, in the power storage module 400D, only the thickness adjustment member 30 may be configured by the first sealing portion 21 coupled to the outermost metal plate 40, or only the thickness adjustment member 30A may be configured by the first sealing portion 21 coupled to the outermost metal plate 50. The thickness adjustment member 30A may be configured by the first sealing portion 21 coupled to the other surface 15b of the metal plate 15 of the negative terminal electrode 18 instead of the first sealing portion 21 coupled to the outermost metal plate 50.

The power storage module and the manufacturing method therefor according to the present invention are not limited to the second embodiment and the respective modification examples thereof, and various modifications can be made. For example, in the second embodiment, and the respective modification examples thereof, one surface in each of the metal plates is roughened, but there is no limitation thereto. For example, only a site included in the coupling region in the one surface may be roughened. In the one surface of the outermost metal plate, only a site included in the coupling region may be roughened. In the second embodiment, and the second modification example and the third modification example thereof, only one surface of the metal plate included in the positive terminal electrode may be roughened, or only a site included in the coupling region in the one surface may be roughened.

In the second embodiment and the respective modification example thereof, each of the metal plates and the outermost metal plate has an approximately rectangular shape in a plan view, but there is no limitation thereto. Each of the metal plates and the outermost metal plate may have a polygonal shape in a plan view, a circular shape, or an elliptical shape. Similarly, each of the end plates, the separators, the sealing body (specifically, the first sealing portions and the second sealing portion), and the thickness adjustment members may have an approximately rectangular frame shape in a plan view.

In the second embodiment and the respective modification examples thereof, the thickness adjustment members are disposed to be aligned with the first sealing portions in the stacking direction, but there is no limitation thereto. According to this, an outer edge of each of the thickness adjustment members and an outer edge of each of the first sealing portions may not be aligned with each other. At this time, the outer edge of the thickness adjustment member may be located to be closer to the center of the electrode stacked body in comparison to the outer edge of the first sealing portion. Only parts of the outer edge of the thickness adjustment member and the outer edge of the first sealing portion may be aligned with each other. Similarly, an inner edge of the thickness adjustment member and an inner edge of the first sealing portion may not be aligned with each other. At this time, the inner edge of the thickness adjustment member may be located to be closer to the center of the electrode stacked body in comparison to the inner edge of the first sealing portion, or may be located to be closer to the outer edge in comparison to the inner edge of the first sealing portion. Parts of the inner edge of the thickness adjustment member and the inner edge of the first sealing portion may be aligned with each other.

In the second embodiment and the respective modification examples thereof, when the first sealing portions adjacent to each other in the stacking direction are in contact with each other, the first sealing portions may be temporarily coupled to each other before forming the second sealing portion. For example, the first sealing portions adjacent to each other may be welded to each other. In this case, intrusion of the second sealing portion into a space between the first sealing portions can be suppressed. The first sealing portion and the thickness adjustment member adjacent to each other in the stacking direction may be temporarily coupled to each other.

In the second embodiment and the respective modification examples thereof, measurement of the thickness of the stacked body is performed simultaneously with formation of the stacked body, but there is no limitation thereto. Measurement of the thickness of the stacked body may be performed after the step of forming the stacked body. The thickness of the stacked body may be measured by adding the thicknesses of respective constituent elements included in the stacked body. For example, the thicknesses of each of the bipolar electrodes, each of the separators, the positive terminal electrode, and the negative terminal electrode may be measured before the step of forming the stacked body.

In the second embodiment, when the outermost metal plates are not recessed, the shape and the surface of one of the outermost metal plate when viewed from one side of the stacking direction are approximately the same as the shape and the surface of the other outermost metal plate when viewed from the other side of the stacking direction. Accordingly, it may be difficult to determine a positive side and a negative side of the power storage module only by observation of the outermost metal plates from an outer side. To prevent the problem in advance, the shape of the sealing body when viewed from the one side of the stacking direction, and the shape of the sealing body when viewed from the other side of the stacking direction may be different from each other. For example, a cut-out portion, a protrusion, or the like may be provided only on an inner periphery side of the sealing body when viewed from the one side of the stacking direction. According to this, the positive side and the negative side of the power storage module can be easily determined. Here, when providing a structure body such as the protrusion or the like in the sealing body, for example, there is a concern that the structure, and the conductive structure body and the like may interfere with each other when manufacturing the power storage module. The cut-out portion may be provided in the sealing body from the viewpoint of preventing the interference. When providing the cut-out portion in the sealing body, the cut-out portion may be formed in the vicinity of the negative terminal electrode in the stacking direction from the viewpoint of suppressing leakage of the electrolytic solution through the cut-out portion due to the alkali creep phenomenon. The cut-out portion and the like may be formed in the sealing body of the modification examples.

In the second embodiment, and the first and third modification examples thereof, the power storage module includes two surplus spaces, but there is no limitation thereto. The power storage module may include at least one surplus space on a movement route of the electrolytic solution when the alkali creep phenomenon occurs.

In the second embodiment and the first and third modification examples thereof, for example, the power storage modules may include a water-repellent material, a liquid absorbing member, or the like. For example, the water-repellent material is provided in a region that is not applied to welding in the metal plates and the outermost metal plate. According to this, the electrolytic solution is less likely to be transferred onto the metal plates. For example, the liquid absorbing member is provided on the one surface of the outermost metal plate adjacent to the negative terminal electrode to surround the conductive structure body. According to this, moisture in the air is less likely to enter the inner space of the power storage module. For example, the water-repellent material is a film-shaped object of a fluorine-based resin material, a fluorine rubber, a polymer having a fluorine-based and methyl-based functional group, or the like. For example, the liquid absorbing member is a non-woven fabric having a sheet shape, or the like. From the viewpoint of improving water absorbance, the liquid absorbing member may be subjected to a plasma treatment.

In the second embodiment, and the second and third modification examples thereof, the thickness adjustment member is in contact with the positive terminal electrode, but there is no limitation thereto. The thickness adjustment member and the positive terminal electrode may be spaced apart from each other. For example, the first sealing portion coupled to the metal plate of the positive terminal electrode may be provided between the thickness adjustment member and the positive terminal electrode.

In the third modification example of the second embodiment, the thickness adjustment members 30 and 30A may have the same configuration or may have configurations different from each other. The thickness adjustment members 30 and 30A may have thicknesses different from each other.

REFERENCE SIGNS LIST 4, 4A, 4B, 400, 400A, 400B, 400C, 400D: power storage module, 11, 11A, 11B: electrode stacked body, 11$a$: side surface, 12: sealing body, 14: bipolar electrode, 15: metal plate, 15$a$: one surface (inner surface), 15$b$: another surface (inner surface), 15$c$: edge portion, 18: negative terminal electrode, 19: positive terminal electrode, 21, 21A, 21B, 21C: first sealing portion, 22: second sealing portion, 30, 30A, 30B, 30C: thickness adjustment member, 40: outermost metal plate, 41: central portion (second contact portion), 50: outermost metal plate, 51: central portion (first contact portion), D: stacking direction, EV1: surplus space (first surplus space), EV2: surplus space (second surplus space), S, SA: stacked body, T, TA, Ta, Tb, T11: thickness, V: inner space, VA: surplus space.

The invention claimed is:

1. A bipolar battery comprising:
an electrode stacked body that includes a stacked body in which a plurality of bipolar electrodes are stacked, a pair of terminal electrodes located on an outer side of the stacked body in a stacking direction of the bipolar electrodes, and a plurality of metal plates which constitute the stacked body and the pair of terminal electrodes; and
a sealing body that is provided to surround a side surface of the electrode stacked body,
wherein the sealing body includes a plurality of first sealing portions coupled to edge portions of the plurality of metal plates, and a second sealing portion that couples the first sealing portions to each other,
a thickness adjustment member that is configured to adjust the thickness of the electrode stacked body and the plurality of first sealing portions in the stacking direction is disposed in the electrode stacked body at a position of overlapping the first sealing portions when viewed from the stacking direction.

2. The bipolar battery according to claim 1,
wherein the thickness adjustment member is formed from the same material as in the first sealing portions, and is configured separately from the first sealing portions.

3. The bipolar battery module according to claim 1,
wherein an outermost first sealing portion of the plurality of first sealing portions functions as the thickness adjustment member.

4. The bipolar battery according to claim 1,
wherein one of the pair of terminal electrodes is a negative terminal electrode,
the other of the pair of terminal electrodes is a positive terminal electrode, and
the thickness adjustment member is disposed at least one of between the stacked body and the negative terminal electrode and between the stacked body and the positive terminal electrode in the stacking direction.

5. The bipolar battery according to claim 4,
wherein the thickness adjustment member is disposed between the stacked body and the negative terminal electrode, and at an edge portion of an inner surface of the metal plate of the negative terminal electrode in the stacking direction.

6. The bipolar battery according to claim 4,
wherein the thickness adjustment member is disposed between the stacked body and the positive terminal electrode, and at the first sealing portion coupled to an edge portion of an inner surface of the metal plate of the positive terminal electrode in the stacking direction.

7. The bipolar battery according to claim 4,
wherein the thickness adjustment member is disposed both between the stacked body and the negative terminal electrode and between the stacked body and the positive terminal electrode in the stacking direction.

8. The bipolar battery according to claim 7,
wherein the thickness of the thickness adjustment member disposed between the stacked body and the negative terminal electrode, and the thickness of the thickness adjustment member disposed between the stacked body and the positive terminal electrode are the same as each other.

9. The bipolar battery according to claim 1,
wherein the electrode stacked body further includes an outermost metal plate that is located directly on an outer side surface of one of the pair of terminal electrodes in the stacking direction,
the stacked body further includes separators stacked alternately with the bipolar electrodes along the stacking direction,
the first sealing portions are coupled to edge portions of the metal plates and the outermost metal plate,
the second sealing portion covers side surfaces of the plurality of first sealing portions, and
the thickness adjustment member is located between the one of the pair of terminal electrodes and the outermost metal plate, and adjusts the thickness of the electrode stacked body in the stacking direction.

10. The bipolar battery according to claim 9,
wherein the one of the pair of terminal electrodes is a negative terminal electrode,
the thickness adjustment member is in contact with the outermost metal plate and the first sealing portion that is coupled to the metal plate of the negative terminal electrode, and
the thickness adjustment member is spaced apart from the negative terminal electrode.

11. The bipolar battery according to claim 9,
wherein the one of the pair of terminal electrodes is a negative terminal electrode, and
the thickness adjustment member is in contact with the negative terminal electrode and the outermost metal plate.

12. The bipolar battery according to claim 9,
wherein the one of the pair of terminal electrodes is a positive terminal electrode, and
the thickness adjustment member is in contact with the positive terminal electrode and the outermost metal plate.

13. The bipolar battery according to claim 9,
wherein the electrode stacked body further includes an additional outermost metal plate that is located on an outer side of the other of the pair of terminal electrodes in the stacking direction, and
an additional thickness adjustment member that adjusts the thickness of the electrode stacked body in the stacking direction is located between the other of the pair of terminal electrodes and the additional outermost metal plate and at a site overlapping the first sealing portions in the stacking direction.

14. The bipolar battery according to claim 9,
wherein the other of the pair of terminal electrodes is a negative terminal electrode,
the electrode stacked body further includes an additional outermost metal plate that is located on an outer side of the negative terminal electrode in the stacking direction,
an alkali electrolytic solution is stored in an inner space made by the electrode stacked body and the sealing body, and
a first surplus space is formed by the negative terminal electrode, the first sealing portion coupled to the metal plate of the negative terminal electrode, and the additional outermost metal plate.

15. The bipolar battery according to claim 13,
wherein a distance from the one of the pair of terminal electrodes to the edge portion of the outermost metal plate along the stacking direction is different from a distance from the other of the pair of terminal electrode to an edge portion of the additional outermost metal plate along the stacking direction.

16. The bipolar battery according to claim 13,
wherein the outermost metal plate includes a first contact portion that is in contact with the one of the pair of terminal electrodes,
the additional outermost metal plate includes a second contact portion that is in contact with the other of the pair of terminal electrodes, and
an area of the first contact portion is different from an area of the second contact portion when viewed from the stacking direction.

17. The bipolar battery according to claim 9,
wherein the thickness adjustment member includes a plurality of layered members stacked along the stacking direction.

18. The bipolar battery according to claim 9,
wherein each of the thickness adjustment member and the plurality of first sealing portions contains an alkali-resistant thermoplastic resin.

19. The bipolar battery according to claim 1, wherein said power storage module is manufactured according to a method comprising:
forming the electrode stacked body by alternately stacking said bipolar electrodes to which the first sealing portions are respectively coupled and separators along the stacking direction;
measuring the thickness of the stacked body along the stacking direction;
calculating a difference between the thickness of the stacked body and a standard thickness of the stacked body along the stacking direction;
stacking the thickness adjustment member having a thickness corresponding to the difference on the first sealing portion in the stacking direction;
stacking an outermost metal plate to which an additional first sealing portion is coupled on the stacking body through the thickness adjustment member; and
forming a second sealing portion that couples the first sealing portions, the thickness adjustment member, and the additional first sealing portion.

20. The method for manufacturing a bipolar battery according to claim 19,
wherein the thickness of the thickness adjustment member corresponds to a difference between a total value obtained by adding the thickness of the outermost metal plate along the stacking direction to the thickness of the stacked body and a total standard value obtained by adding a standard thickness of the outermost metal plate along the stacking direction to the standard thickness of the stacked body along the stacking direction.

21. The method for manufacturing a bipolar battery according to claim 19,
wherein the step of forming the stacked body and the step of measuring the thickness of the stacked body are simultaneously performed.

* * * * *